United States Patent
Chigira et al.

(10) Patent No.: US 7,028,887 B2
(45) Date of Patent: *Apr. 18, 2006

(54) DISPATCH OPERATION PLAN DEVISING SYSTEM AND COMPUTER READABLE RECORD MEDIUM STORING A DISPATCH OPERATION PLAN DEVISING PROGRAM

(75) Inventors: Kenichi Chigira, Gunma (JP); Hiroyuki Ishijima, Gunma (JP); Masayuki Akita, Gunma (JP); Hiroyuki Takamatsu, Gunma (JP); Katsumi Ohyama, Tochigi (JP); Tsugio Taki, Gunma (JP); Hideki Yagisawa, Gunma (JP)

(73) Assignee: Fujitsu Limited, Kawasaki (JP)

( * ) Notice: Subject to any disclaimer, the term of this patent is extended or adjusted under 35 U.S.C. 154(b) by 46 days.

This patent is subject to a terminal disclaimer.

(21) Appl. No.: 10/739,942

(22) Filed: Dec. 19, 2003

(65) Prior Publication Data
US 2004/0217162 A1 Nov. 4, 2004

(30) Foreign Application Priority Data
Dec. 24, 2002 (JP) .............................. 2002-372433

(51) Int. Cl.
*G06F 7/00* (2006.01)
(52) U.S. Cl. ...................................... 235/376; 235/380
(58) Field of Classification Search ................ 235/379, 235/380, 381, 383, 375, 376; 705/10, 35, 705/400, 28, 43; 707/100
See application file for complete search history.

(56) References Cited

U.S. PATENT DOCUMENTS

| | | | |
|---|---|---|---|
| 5,799,288 A | 8/1998 | Tanaka et al. | |
| 5,886,984 A * | 3/1999 | Abu-Amara et al. | 370/252 |
| 6,442,554 B1 * | 8/2002 | Reddy et al. | 707/100 |
| 2003/0050870 A1 * | 3/2003 | Cargille et al. | 705/28 |
| 2003/0110104 A1 * | 6/2003 | King et al. | 705/28 |
| 2004/0030622 A1 * | 2/2004 | Ramos et al. | 705/35 |
| 2004/0158539 A1 * | 8/2004 | Akita et al. | 705/400 |
| 2004/0169722 A1 * | 9/2004 | Pena | 348/14.01 |
| 2004/0178259 A1 * | 9/2004 | Scarafile et al. | 235/379 |
| 2004/0205074 A1 * | 10/2004 | Berkery et al. | 707/100 |
| 2004/0215566 A1 * | 10/2004 | Meurer | 705/43 |
| 2005/0010468 A1 * | 1/2005 | Power | 705/10 |
| 2005/0060125 A1 * | 3/2005 | Kaiser | 702/186 |
| 2005/0073584 A1 * | 4/2005 | Enright et al. | 348/150 |

FOREIGN PATENT DOCUMENTS

| | | |
|---|---|---|
| JP | 3-103937 | 4/1991 |
| JP | 4-70964 | 3/1992 |
| JP | 3006141 | 11/1992 |
| JP | 9-27002 | 1/1997 |
| JP | 9-311900 | 2/1997 |
| JP | 2003-242362 | 8/2003 |

* cited by examiner

Primary Examiner—Thien M. Le
(74) Attorney, Agent, or Firm—Staas & Halsey LLP

(57) ABSTRACT

A dispatch operation plan devising system comprises a demand estimating unit estimating a demand for a replenishment in a cash automatic transaction apparatus and an enforcement plan making unit making an enforcement plan for a dispatch operation on the basis of a result of estimation for demand made by the demand estimating unit so that a cost of dispatching an operator is minimum, thereby devising the most suitable plan with respect to the cost of the dispatch operation that the operator is dispatched to the cash automatic transaction apparatus and operates thereat. The operation cost can be reduced and the business efficiency can be improved.

20 Claims, 11 Drawing Sheets

FIG. 4

| DELIVERY PERSON | LAST DELIVERY DATE | 11/1 | 11/2 | 11/3 | 11/4 | 11/5 | 11/7 | 11/8 | 11/9 | 11/10 | 11/11 | 11/12 |
|---|---|---|---|---|---|---|---|---|---|---|---|---|
| A | OCT. 15 | ○ | ○ | ○ | × | × | × | ○ | ○ | ○ | ○ | × |
| B | OCT. 30 | ○ | × | × | ○ | ○ | ○ | ○ | ○ | ○ | ○ | × |
| C | SEP. 25 | × | × | ○ | ○ | × | × | ○ | × | ○ | × | ○ |
| D | OCT. 1 | ○ | ○ | ○ | ○ | ○ | ○ | ○ | ○ | ○ | × | × |
| E | OCT. 1 | × | × | × | × | × | ○ | ○ | ○ | ○ | ○ | ○ |

MOVING TIME TABLE

| STORE NAME | RELATION | MOVING TIME |
|---|---|---|
| A STORE (MOTHER OFFICE) | A–B | 10 |
| | A–C | 25 |
| | A–D | 22 |
| B STORE | B–A | 10 |
| | B–C | 30 |
| | B–D | 35 |
| C STORE | C–A | 25 |
| | C–B | 30 |
| | C–D | 35 |
| D STORE | D–A | 22 |
| | D–B | 30 |
| | D–C | 35 |

DISPATCH OPERATION PLAN DEVISING SYSTEM AND COMPUTER READABLE RECORD MEDIUM STORING A DISPATCH OPERATION PLAN DEVISING PROGRAM

BACKGROUND OF THE INVENTION (1) Field of the Invention

The present invention relates to a dispatch operation plan devising system suitable for use to devise an enforcement plan of a dispatch operation to an automatic transaction apparatus such as an automated teller machine (ATM) in a store of a bank or other financial institution, and a computer readable record medium storing a dispatch operation plan devising program.

(2) Description of Related Art

Replenishment of cash in or collection of cash from an automatic cash transaction machine [hereinafter referred as an ATM (Automatic Teller Machine) or an automatic machine] installed in an automatic machine corner or an unattended automatic machine corner of a bank is carried out by (a) staffs of a security company according to an instruction from a person in charge of a store or the like of the bank.

Concretely, a person in charge of the store or the like of the bank estimates the number of demanded bills at the ATM using a method disclosed in, for example, patent document 1, examines how much funds need to be replenished in (or collected from) which ATM (distribution/opportunity) on the basis of an estimated number of demanded bills, and makes a document of an funds replenishment instruction.

The person in charge transmits the made funds replenishment instruction document to a cash raising division using a facsimile or the like to request it to raise necessary cash. The person in charge also transmits the made funds replenishment instruction document to the security company using a facsimile or the like to request it to deliver (replenish) cash to the ATM or collect surplus funds from the ATM.

The cash raising division deposits an instructed amount of funds in an account for loading funds at the instructed time according to the cash replenishment instruction document. The security company withdraws the instructed amount of cash from the account for loading at the instructed time according to the cash replenishment instruction document, and delivers (fills) it to the ATM or collect the instructed amount of surplus funds from the ATM.

In the security company, a person in charge manually determines staff arrangement (scheduling) about, for example, who goes to which ATM and carried out the operation in order to deliver the funds to the ATM (from ATM).

[Patent Document]

Japanese Patent Laid-Open Publication No. 9-27002 (page 11, FIG. 15)

According to the above cash delivery method, a person in charge of the store determines the time to replenish/collect cash in/from the ATM on the basis of his/her experience or perception. There is thus possibility that the operation of the ATM stops due to shortage of the cash, or, conversely, that an interest loss generates because the cash in the ATM becomes surplus funds. Incidentally, it is desirable that such surplus funds are suppressed as much as possible.

There is another possibility that requesting the security company to deliver funds more frequently than needed causes an increase in dispatch cost. Generally, the financial institution makes a contract with the security company that the security company periodically dispatches the staff(s), for example. This periodical dispatch contract is that the security company dispatches the staff(s) a predetermined number of times within a predetermined period of time (for example, one month) at a fixed charge (for example, 20,000 yen). When the financial institution makes the dispatch request more often than the predetermined number of times, the financial institution has to pay a comparatively high charge for an extra dispatch (for example, 6,000 yen for every dispatch). Accordingly, requesting the security company to dispatch more often than the predetermined number of times causes an increase in charge to be paid to the security company, which leads to an increase in operation cost.

The ATM needs to be replenished with consumables (for example, receipt forms, journal forms, transfer tickets, receipt/payment slips, passbooks to be issued, etc.). The security company requested from the financial institution dispatches the staff(s) and the staff(s) replenishes such consumables, as well. Concretely, when the ATM detects "near-end" or "end" of a medium such as the journal forms, for example, the ATM notifies the financial institution of a warning that the consumable (medium) needs to be replenished. In response to the warning, the financial institution requests the security company to dispatch the staff(s).

The ATM is equipped with a preventive maintenance system made by the manufacturer of the ATM to detect in prior a sign of abnormality as to, for example, when a mechanical failure will occur in the ATM. In such the preventive maintenance system, the manufacturer confirms the time to replace a maintenance part, and procures the maintenance part in accord with the time to replace. When the time to replace comes, the manufacturer notifies the security company of it, and an operator of the manufacturer is accompanied by a guard man of the security company to do the maintenance operation in the presence of the guard man.

Heretofore, the maintenance operation requires arrangement of the operation schedule between the security company and the manufacturer, which is troublesome. Particularly, when the maintenance part needs to be replaced in near future, it is necessary to arrange the schedule as soon as possible. If the schedule arrangement is not made in time so that a trouble occurs in the ATM, the ATM becomes unavailable, thus the security company needs to dispatch the staff(s) there in order to repair the trouble.

Even when the security company dispatches the staff(s) to replenish the consumables or to do the maintenance operation, it is included in the number of times to dispatch defined in the above periodical dispatch contract.

Heretofore, the person in charge of the store does not manage estimation, planning or anything of dispatch of the operator in order to replenish and/or replace the consumables and do the maintenance operation. When a warning to replenish or replace the consumables is notified, or when a trouble occurs, or when the manufacturer makes a contact with the person in charge of the store, the person in charge handles it each time an event occurs, so that the person in charge makes the security company a request for dispatch not included in the predetermined number of times in order to replenish/replace the consumables or do the maintenance operation. This frequently leads to a higher-rate extraordinary dispatch charge to be paid. In other words, the financial institution has to pay a charge more than the appropriate dispatch charge to the security company.

SUMMARY OF THE INVENTION

In the light of the above problems, an object of the present invention is to provide a dispatch operation plan devising system and a computer readable record medium storing a dispatch operation plan devising program, which can devise a plan for a dispatch operation that an operator is dispatched to a cash automatic transaction apparatus and works thereat, the plan being able to seek the optimum cost. Whereby, the operation cost can be reduced and the business efficiency can be improved.

The present invention therefore provides a dispatch operation plan devising system devising a plan for at least one dispatch operation that an operator is dispatched to a cash automatic transaction apparatus and works thereat, comprising a demand estimating unit estimating a demand for a replenishment to the cash automatic transaction apparatus, and an enforcement plan making unit making an enforcement plan for the dispatch operation on the basis of a result of demand estimation made by the demand estimating unit so that a cost of dispatch of the operator is minimized.

The present invention further provides a dispatch operation plan devising system devising a plan for at least one dispatch operation that an operator is dispatched to a cash automatic transaction apparatus and works thereat, comprising an abnormal information obtaining unit obtaining abnormal information on the cash automatic transaction apparatus, and an enforcement plan making unit making an enforcement plan for the dispatch operation on the basis of the abnormal information so that a cost of dispatch of the operator is minimized.

The present invention still further provides a dispatch operation plan devising system devising a plan for at least one dispatch operation that an operator is dispatched to a cash automatic transaction apparatus and works thereat, comprising a demand estimating unit estimating a demand for a replenishment to the cash automatic transaction apparatus, an abnormal information obtaining unit obtaining abnormal information on the cash automatic transaction apparatus, and an enforcement plan making unit making an enforcement plan for the dispatch operation on the basis of a result of demand estimation made by the demand estimating unit and the abnormal information so that a cost of dispatch of the operator is minimized.

The replenishment may be cash, and the enforcement plan making unit may make an enforcement plan for the dispatch operation on the basis of a surplus interest loss of the cash in the cash automatic transaction apparatus and the number of times of dispatch of the operator. Alternatively the replenishment may be consumables, and the enforcement plan making unit may make an enforcement plan for the dispatch operation on the basis of the number of times of dispatch of the operator.

The dispatch operation plan devising system may comprise an operator selecting unit selecting at least one operator who does the dispatch operation among two or more operator candidates who can be the operator to do the dispatch operation on the basis of dispatch history information on the operator candidates.

The operator selecting unit may preferentially select, as said operator, an operator candidate who has been dispatched a less number of times among the two or more operator candidates on the basis of the dispatch history information. Alternatively, the operator selecting unit may preferentially select, as the operator, an operator candidate who has not been dispatched for a longer period of time since the operator candidate was dispatched the last time among the two or more operator candidates on the basis of the dispatch history information.

The dispatch operation plan devising system may further comprise an actual demand calculating unit calculating an actual demand for the replenishment on the basis of an actual situation of transactions at the cash automatic transaction apparatus, a demand comparing unit comparing an actual demand for the replenishment calculated by the actual demand calculating unit with an estimated demand for the replenishment by the demand estimating unit, and a warning unit generating warning when it is determined by the demand comparing unit that the actual demand for the replenishment is greater than the estimated demand.

The dispatch operation plan devising system may still further comprise a compensating unit being able to compensate the enforcement plan made by the enforcement plan making unit. When a plurality of the cash automatic transaction apparatuses are disposed, the compensating unit may compensate the enforcement plan for each cash automatic transaction apparatus or for a predetermined number of cash automatic transaction apparatuses as a unit.

The dispatch operation plan devising system may still further comprise a needlessness notifying unit notifying that the dispatch operation is unnecessary when it is determined by the demand comparing unit that the dispatch operation planned by the enforcement plan making unit is unnecessary.

The dispatch operation plan devising system may still further comprise an operation setting retaining unit being able to retain an operation setting set according to operation characteristic information which is information about an operation characteristic of the cash automatic transaction apparatus, the enforcement plan making unit making an enforcement plan for the dispatch operation according to the operation setting retained in the operation setting retaining unit.

The dispatch operation plan devising system may still further comprise an operation route calculating unit calculating a route to each cash automatic transaction apparatus in order to do the dispatch operation at each of a plurality of cash automatic transaction apparatuses.

The dispatch operation plan devising system may still further comprise an evaluating unit evaluating an existing dispatch mode on the basis of an enforcement plan for the dispatch operation made by the enforcement plan making unit.

The present invention still further provides a computer readable record medium holding a dispatch operation plan devising program for devising a plan for at least one dispatch operation that an operator is dispatched to a cash automatic transaction apparatus and works thereat, the dispatch operation plan devising program making a computer function as a demand estimating unit estimating a demand for a replenishment to the cash automatic transaction apparatus, and an enforcement plan making unit making an enforcement plan for the dispatch operation on the basis of a result of demand estimation made by the demand estimating unit so that a cost of dispatch of the operator is minimized.

As above, the dispatch operation plan devising system and the computer readable record medium storing a dispatch operation plan devising program according to this invention provide the following effects and advantages.

(1) An enforcement plan for the dispatch operation is made on the basis of a result of estimated demand for the replenishments in the cash automatic transaction apparatus so that the cost of dispatch of the operator is minimized. Accordingly, the operation cost can be reduced and the business efficiency can be improved.

(2) An enforcement plan for the dispatch operation is made on the basis of abnormal information on the cash automatic transaction apparatus so that the cost of dispatch of the operator is minimized. Accordingly, the operation cost can be reduced and the business efficiency can be improved.

(3) At least one operator who does the dispatch operation is selected among two or more candidates for the operator who can do the dispatch operation on the basis of dispatch history information on these operator candidates. Accordingly, it is possible to dispatch the operator efficiently.

(4) An operator candidate who has been dispatched a less number of times is preferentially selected as the operator among two or more operator candidates. Accordingly, it is possible to dispatch the operator efficiently.

(5) An operator candidate who has not been dispatched for a longer time since his/her last dispatch operation is preferentially selected as the operator among two or more operator candidates. Accordingly, it is possible to dispatch the operator efficiently.

(6) An actual demand for the replenishments is calculated on the basis of an actual situation of transactions at the cash automatic transaction apparatus, the calculated actual demand for the replenishments is compared with an estimated demand for the replenishments. When it is determined that the actual demand for the replenishment is greater than the estimated demand, an alarm is generated. Accordingly, it is possible to make an enforcement plan for the dispatch operation meeting the actual operation, improve the reliability and prevent beforehand the cash automatic transaction apparatus from stopping.

(7) A made enforcement plan can be compensated. Accordingly, it is possible to made an efficient delivery plan.

(8) When a plural number of cash automatic transaction apparatuses are installed, an enforcement plan can be compensated for each cash automatic transaction apparatus or a predetermined number of cash automatic transaction apparatuses as a unit. Accordingly, a high-accurate operation on each cash automatic transaction apparatus is possible.

(9) When it is determined that the dispatch operation planned by the enforcement plan making unit is unnecessary, a notice that the dispatch operation is unnecessary is made. Accordingly, it is possible to avoid wasteful dispatch, and reduce the dispatch cost.

(10) The operation setting retaining unit can retain an operation setting set according to operation characteristic information which is information as to operational characteristics of the cash automatic transaction apparatus. An enforcement plan for the dispatch operation is made according to the operation setting retained in the operation setting retaining unit. This enables flexible operation meeting an operational characteristics of each cash automatic transaction apparatus.

(11) The operation route calculating unit is provided to calculate an efficient route for dispatch. Accordingly, it is possible to reduce the number of times of stoppage of the cash automatic transaction apparatus due to lack of the replenishment.

(12) An existing dispatch mode is evaluated on the basis of a made enforcement plan for dispatch operation. Accordingly, it is possible to make a delivery plan instruction document meeting the actual operation, improve the reliability and beforehand prevent the cash automatic transaction apparatus from stopping.

BRIEF DESCRIPTION OF THE DRAWINGS

FIG. 4 is a diagram showing an example of delivery person schedule database in the dispatch operation plan devising system according to the embodiment of this invention;

DESCRIPTION OF THE PREFERRED EMBODIMENTS

Hereinafter, description will be made of embodiments of the present invention with reference to the drawings.

(A) Description of Embodiments

Figure 1:
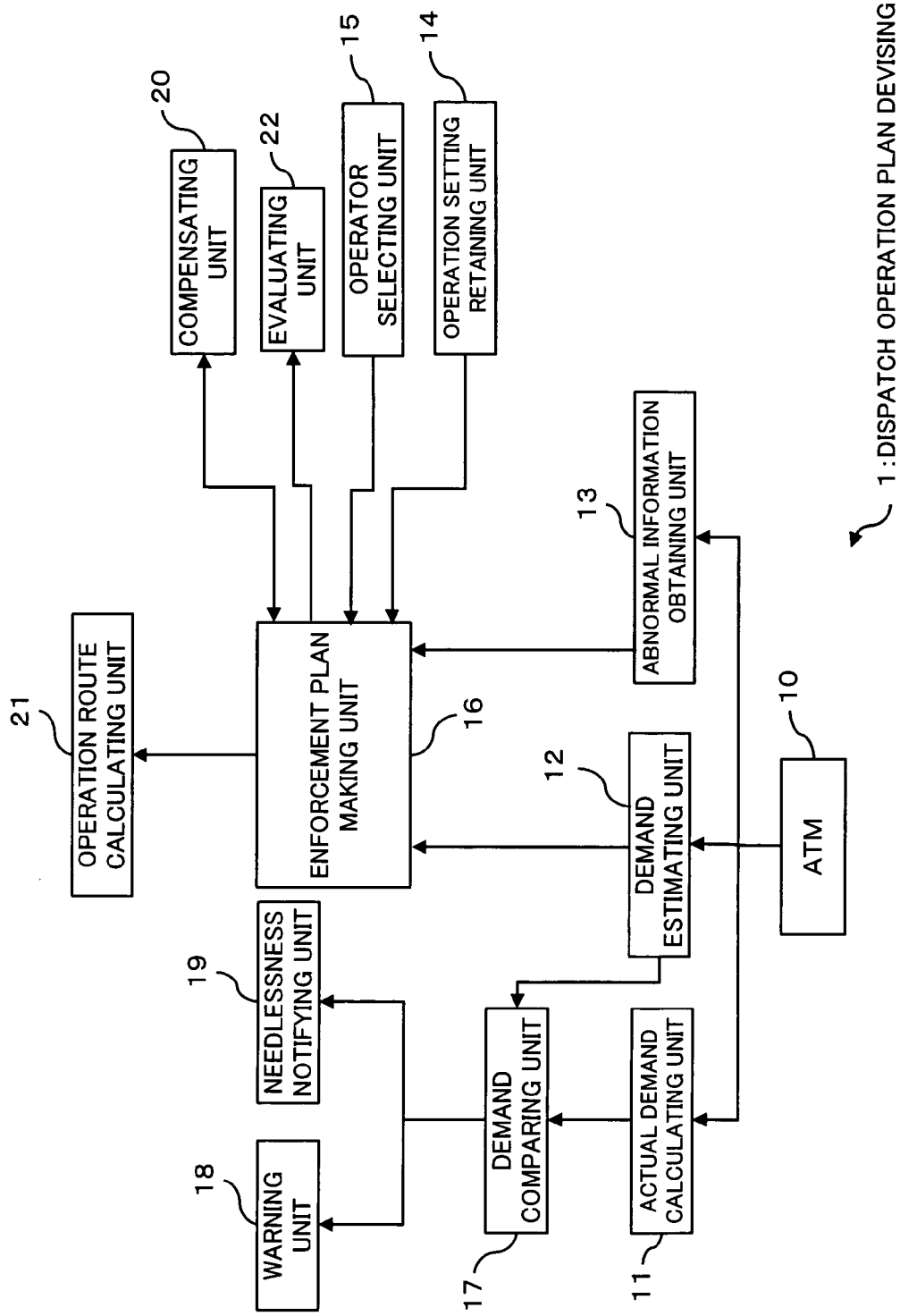
FIG. 1 is a diagram schematically showing a structure of a dispatch operation plan devising system according to an embodiment of this invention.

FIG. 1 is a diagram showing a functional structure of a dispatch operation plan devising system according to an embodiment of this invention.

The dispatch operation plan devising system 1 devises a plan for one or more times of dispatch operation that an operator is dispatched to an ATM (Automated Teller Machine) and carries out the operation thereat. The dispatch operation plan devising system 1 is equipped to a financial institution such as a bank, a credit card company or the like.

The dispatch operation plan devising system 1 comprises, as shown in FIG. 1, an ATM 10, an actual demand calculating unit 11, a demand estimating unit 12, an abnormal information obtaining unit 13, an operation setting retaining unit 14, an operator selecting unit 15, an enforcement plan making unit 16, a demand comparing unit 17, a warning unit 18, a needlessness notifying unit 19, a compensating unit 20, an operation route calculating unit 21 and an evaluating unit 22.

The ATM (Automated Teller Machine) 10 is a cash automatic transaction apparatus installed in a bank, a store, an attended store or the like by a financial institution such as a bank, a credit card company or the like, inside of which cash can be accommodated. The ATM can carry out various processes such as withdrawal, deposit or anything according to an operation (transaction) of a user (customer). Incidentally, cash (bills, coins) loaded in the ATM 10 is a consumable that is consumed due to transactions at the ATM 10, which is also a replenishment replenished by a financial institution or the like at need. Hereinafter, description of the embodiment will be made by way of example where cash is represented by bills, for the sake of convenience.

Meanwhile, cash loaded in the ATM 10 and not used by customers but still remaining in the ATM 10 is called surplus funds. It is desirable to suppress such surplus funds as much as possible.

The ATM 10 accommodates receipt forms, journal forms, transfer tickets, receipt/payment slips, passbooks to be issued, etc. The ATM 10 prints contents of various transactions conducted with customers, and outputs or retains the prints. The receipt forms, the journal forms, the transfer tickets, the receipt/payment slips and passbooks to be issued are consumables to be consumed by making transactions at the ATM 10, and are replenishments to be replenished by the financial institution or the like at need. Incidentally, FIG. 1 shows only one ATM 10, but two or more ATMs 10 may be provided, not limited to the example shown in FIG. 1.

The ATM 10 has a self-diagnostic function to diagnose each function and mechanism of the ATM 10 at the time of power-on, or when receiving an instruction from an operator (maintenance person) of the manufacturer or the security company, or when receiving an instruction from a center monitoring apparatus 42 (refer to FIG. 2) which is a higher apparatus, or at regular intervals. When abnormality is detected by the self-diagnosis, the ATM 10 transmits abnormal information to the abnormal information obtaining unit 13 to be described later.

The demand estimating unit 12 estimates the demand for the replenishments in the ATM 10. In the dispatch operation plan devising system 1, the demand estimating unit 12 estimates the demand for cash and the demand for consumables in the ATM 10. In other words, the demand estimating unit 12 also estimates the demand for consumables such as the receipt forms, the journal forms, the transfer tickets, the receipt/payment slips, the passbooks to be issued, etc.

If a plurality of ATMs 10 are installed in the store or the like, the demand estimating unit 12 may regard these ATMs 10 installed in the same store as one ATM 10 (group management), and estimate a total number of demanded bills (a total number of all demanded bills). If a plurality of ATMs 10 are installed in the store or the like, the demand estimating unit 12 may regard these ATMs 10 installed in the same store as one ATM 10 (group management) to estimate a total number of forms/tickets/slips/passbooks (a total number of demanded consumables).

The abnormal information obtaining unit 13 obtains a sign of apparatus abnormality (abnormal information) of the ATM 10 transmitted from the ATM 10.

The enforcement plan making unit 16 makes an enforcement plan of the dispatch operation so as to minimize the cost of dispatch of an operator on the basis of a result of demand estimation made by the demand estimating unit 12. The enforcement plan making unit 16 makes the enforcement plan of the dispatch operation so as to minimize the cost of dispatch of an operator on the basis of abnormal information obtained by the abnormal information obtaining unit 13, as well.

The actual demand calculating unit 11 calculates an actual demand (actual results) for the replenishments of the ATM 10, calculating an actual result value of the replenishment (cash or consumables) actually replenished in the ATM 10 by an operator or the like of the security company. Concretely, the actual demand calculating unit 11 calculates an actual demand for cash or the replenishments on the basis of contents actually transacted at the ATM 10, or calculates an actual demand for cash or the replenishments on the basis of a replenishment report made by an operator or the like of the security company.

The demand comparing unit 17 compares an actual demand for the replenishment calculated by the actual demand calculating unit 11 with an estimated demand for the replenishment by the demand estimating unit 12. The demand comparing unit 17 determines whether or not an actual demand for the replenishment is greater than the estimated demand. When the actual demand for the replenishment is smaller than the estimated demand, the demand comparing unit 17 determines that a dispatch operation planned by the enforcement plan making unit is unnecessary.

The warning unit 18 warns a person in charge of the financial institution when the demand comparing unit 17 determines that the actual demand for the replenishment is greater than the estimated demand. When the actual demand for the replenishment is greater than the estimated demand, the replenishment will run out earlier than the plan. For this, the warning unit 18 warns the person in charge of the financial institution of it, whereby the person in charge can re-make the plan already made by the enforcement plan making unit 16 to prevent in prior the ATM 10 from stopping.

When the demand comparing unit 17 determines on the basis of the comparison that the dispatch operation planned by the enforcement plan making unit 16 is unnecessary, the needlessness notifying unit 19 notifies the person in charge of the financial institution that the dispatch operation is unnecessary. The compensating unit 20 can compensate the enforcement plan made by the enforcement plan making unit 16.

The operation setting retaining unit 14 can retain an operation setting set according to operational characteristics information which is information about operational characteristics of the ATM 10. The operational characteristics information is various characteristics generating in the operation of each ATM 10, which differs according to environments (a place) in which the ATM 10 is installed.

The evaluating unit 22 evaluates a result of the dispatch operation carried out in accordance with the enforcement plan of the dispatch operation made by the enforcement plan making unit 16. The evaluating unit 22 evaluates whether or not contents of the enforcement plan are appropriate, whereby it is possible to reconsider contents of the contract made with the security company.

The operator selecting unit 15 selects at least one operator to carry out the dispatch operation among two or more candidate operators who can carry out the dispatch operation on the basis of dispatch history information on these operators. The operator selecting unit 22 selects preferentially an operator who has been dispatched a less number of times among the above two or more candidate operators, or selects preferentially an operator who has not been dispatched for a longer time since his/her last dispatch operation.

The operation route calculating unit 21 calculates a route around a plurality of ATMs 10 in order to carry out the dispatch operation at each of the plural ATMs 10 on the basis of the enforcement plan made by the enforcement plan making unit 16.

Figure 2:
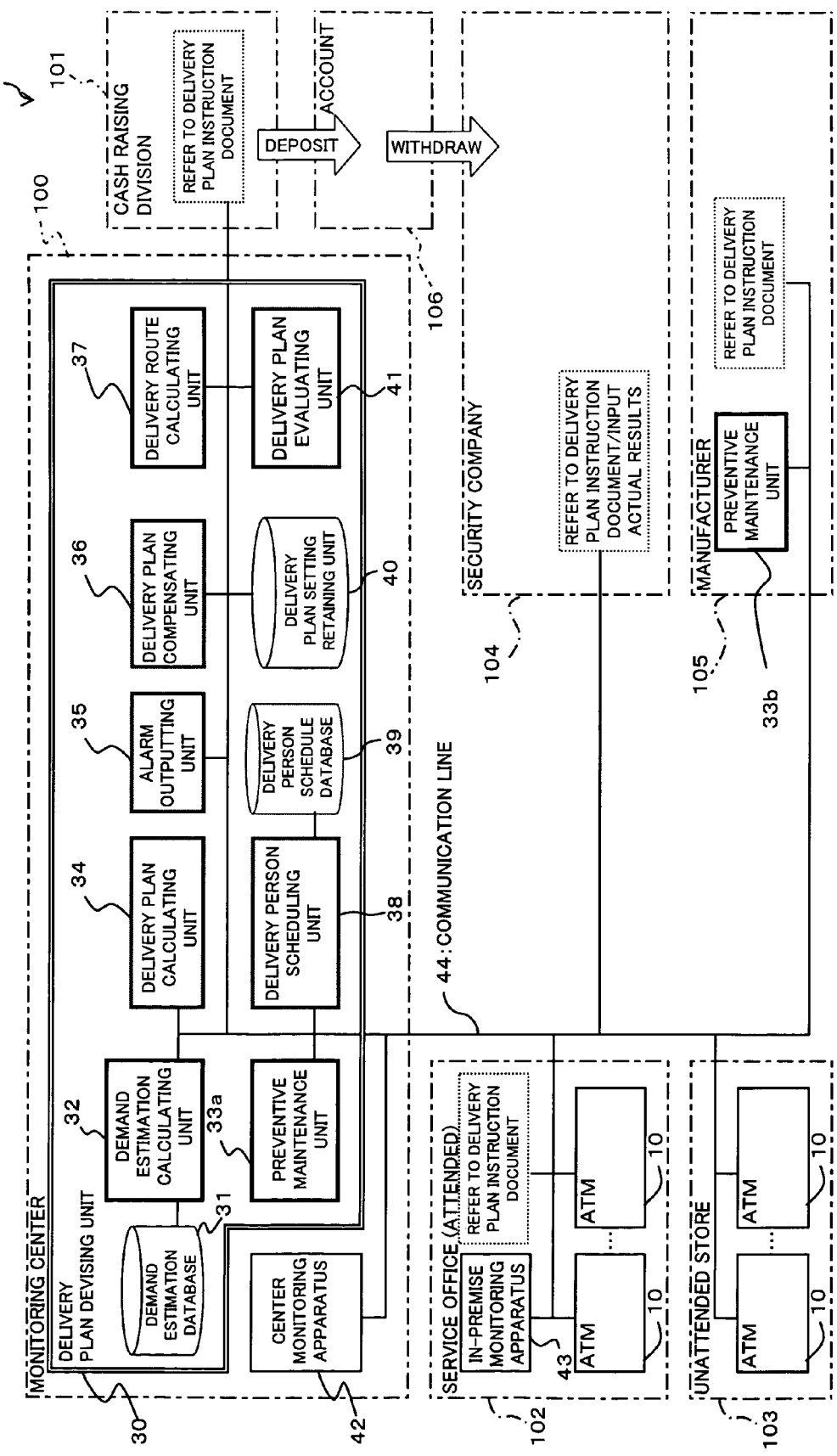
FIG. 2 is a block diagram showing a structure of the dispatch operation plan devising system according to the embodiment of this invention.

FIG. 2 is a block diagram showing a structure the dispatch operation plan devising system 1 according to the embodiment of this invention. The dispatch operation plan devising system 1 is configured by communicably connecting at least one ATM (Automated Teller Machine: automatic teller machine, cash automatic transaction apparatus, store apparatus) 10 installed in a service office (attended store) 102 or an unattended store 103 of a financial institution such as a bank or the like, a delivery plan devising unit 30 and a center monitoring apparatus 42 installed both in a monitoring center 100 one to another over a communication line 44. Incidentally, like reference characters in FIG. 2 designate like or corresponding parts in FIG. 1, detailed descriptions of which are thus omitted.

The monitoring center 100 collectively estimates the demand for the replenishments (cash and replenishments) and the demand for a maintenance operation at all stores (the service office 102, the unattended store 103 and the like) of the financial institution having the dispatch operation plan devising system 1. On the basis of results of the estimated demands, the monitoring center 100 makes a delivery plan (delivery plan instruction document) as to when and how much (amount) the replenishments should be delivered, not through a person in charge of each service office 102, so that the total cost is minimized in consideration of a relationship of a cost of surplus funds interest loss with a security company dispatch cost. The delivery plan devising unit 30 is installed in a head office (mother office) or the like of the financial institution, for example.

The delivery plan devising unit 30 comprises a demand estimation database 31, a demand estimation calculating unit 32 (the demand estimating unit 12) a preventive maintenance unit 33a (the abnormal information obtaining unit 13), a delivery plan calculating unit 34 (the enforcement plan making unit 16), an alarm outputting unit 35 (the warning unit 18, the needlessness notifying unit 19), a delivery plan compensating unit 36 (the compensating unit 20), a delivery route calculating unit 37 (the operation route calculating unit 21), a delivery person scheduling unit 38 (the operator selecting unit 15) a delivery person schedule database 39, a delivery plan setting retaining unit 40 (the operation setting retaining unit 14), and a delivery plan evaluating unit 41 (the evaluating unit 22).

The demand estimation database 31 is written therein various kinds of transaction data at each ATM 10 to be used by the demand estimation calculating unit 32 to be described later. The demand estimation database 31 is formed in a storage such as a hard disk, a memory or the like in a computer system, for example. The transaction data described below in ① to ⑥, for example, is periodically drawn from a control unit (not shown) of each ATM 10 over the communication line 44, and stored in the demand estimation database 31.

① machine specifying data: bank number, branch number, machine number;

② transaction date/time: year/month/day, transaction start time, transaction end time;

③ transaction type: withdrawal, deposit, transfer, balance inquiry;

④ the number of withdrawn bills: 10,000-yen bills, 5,000-yen bills, 2,000-yen bills, 1,000-yen bills, various coins;

⑤ the number of deposited bills: 10,000-yen bills, 5,000-yen bills, 2,000-yen bills, 1,000-yen bills, various coins;

⑥ the number (amount) of stored bills in machine: 10,000-yen bills, 5,000-yen bills, 2,000-yen bills, 1,000-yen bills, various coins.

The demand estimation calculating unit 32 estimates the demand for the replenishments in the ATM 10, functioning as the above described demand estimating unit 12. The demand estimation calculating unit 32 calculates and estimates the quantity of demanded replenishments within a designated period of time at the ATM 10 on the basis of past transaction data at the ATM 10, as disclosed in Japanese Patent Laid-Open Publication No. 9-27002, for example.

The demand estimation calculating unit 32 estimates the number of demanded bills (replenishment) at each ATM 10. The demand estimation calculating unit 32 has a function of writing transaction data in a predetermined area of the demand estimation database 31 when the transaction data is collected from each ATM 10, and a function of calculating and estimating the number of demanded bills within an estimation period of time on the basis of past transaction data of each ATM 10 accumulated in the demand estimation database 31. In the dispatch operation plan devising system 1, the demand estimation calculating unit 32 estimates the number of demanded bills (an amount of demanded cash) to be consumed by customers, using an estimation system called Hayashi's quantification theory.

The demand estimation calculating unit 32 collects the amount of receipts and payments and the number of bills per unit time of the ATM 10, stores them in the demand estimation database 31, and estimates the demand for cash at the ATM on the basis of information stored in the demand estimation database 31.

The demand estimation calculating unit 32 can calculate and estimate the number of demanded bills within a designated period of time at each ATM 10 on the basis of past transaction data accumulated in the demand estimation database 31, and manage the number of demanded bills at each ATM 10 on the basis of the estimated value. Accordingly, it is possible to certainly compress the amount of funds to be loaded without relying on the person in charge of the store, and largely decrease the load on the person in charge of the store. The demand estimation calculating unit 32 numerically expresses qualitative factors such as day of the week, date, etc. as degrees of effect, so that the number of demanded bills at the cash automatic transaction apparatus can be estimated, taking various qualitative factors into consideration, and high-precision estimation is possible.

When a plurality of ATMs 10 are installed in the service office 102, the unattended store 103 or the like, the demand estimation calculating unit 32 may regard these plural ATMs 10 installed in the same store as one ATM 10 (group management), and estimate the total number of demanded bills (the total amount of demanded cash).

The demand estimation calculating unit 32 estimates the demand for replenishments such as the receipt forms, the journal forms, the transfer slips, the receipt/payment slips, the passbooks to be issued, etc. on the basis of past transaction data accumulated in the demand estimation database 31. Concretely, the demand estimation calculating unit 32 collects the quantity of consumed replenishments on the basis of the amount of transactions (the number of transactions) at the ATM 10, stores it in the demand estimation database 31, and estimates the demand for the replenishments at the ATM 10 on the basis of information stored in the demand estimation database 31 like cash in the above example of cash.

With regard to the consumables, when a plurality of ATMs 10 are installed in a store or the like, the demand estimation calculating unit 32 may regard these plural ATMs 10 installed in the same store 102 or 103 as one ATM 10 (group management), and estimate the total quantity of demanded consumables (the quantity of demand for total consumables), like cash.

Note that the manner of estimating the demand for the replenishments (cash, consumables) carried out by the demand estimation calculating unit 32 is not limited to the method disclosed in Japanese Patent Laid-Open Publication No. 9-27002, but may be modified in various ways without departing from the scope of the invention.

The preventive maintenance unit 33*a* (the abnormal information obtaining unit 13) obtains a sign (abnormal information) of apparatus abnormality of the ATM 10 transmitted from the ATM 10. The preventive maintenance unit 33*a* classifies obtained abnormal information according to predetermined function blocks, and analyzes the number of times of occurrence of abnormal information and degrees of importance of errors in each function block. The preventive maintenance unit 33*a* calculates the time to repair/replace a hardware part on the basis of a result of the analysis. Further, when the number of times of occurrence of the error information (errors) or the degree of importance of the same exceeds a preset allowable limitation, the preventive maintenance unit 33*a* notifies the delivery plan calculating unit 34 that a relevant part (function block) should be repaired/replaced.

The delivery plan calculating unit 34 (the enforcement plan making unit 16) makes a delivery plan instruction document (enforcement plan) of the dispatch operation on the basis of a result of estimated demand by the demand estimation calculating unit 32 and/or abnormal information obtained by the preventive maintenance unit 33*a* so as to minimize the cost of the operator dispatch.

Concretely, the delivery plan calculating unit 34 makes a delivery plan instruction document with respect to cash to be replenished or collected on the basis of a relationship between the cost of interest loss of surplus funds in the ATM 10 and the security company dispatch cost, so as to minimize the total cost.

With respect to the consumable replenishment operation, the delivery plan calculating unit 34 makes a delivery plan instruction plan document so as to minimize the number of times of dispatch of the operator of the security company, thereby to minimize the total cost. Concretely, the delivery plan calculating unit 34 makes the delivery plan instruction document instructing the operator, who carries out the cash replenishing/collecting operation and the maintenance operation, to replenish the consumables at the same time. The delivery plan calculating unit 34 makes the delivery plan instruction document instructing the operator to replenish other consumable when he/she replenishes certain consumable.

The delivery plan calculating unit 34 makes an enforcement plan of the dispatch operation so as to minimize the cost of dispatch of the operator on the basis of abnormal information obtained by the preventive maintenance unit 33*a*, as well. Namely, the delivery plan calculating unit 34 makes the delivery plan instruction document so as to decrease the number of times of dispatch of the operator of the security company as much as possible, thereby minimizing the total cost. Concretely, the delivery plan calculating unit 34 makes the delivery plan instruction document instructing the operator to carry out the maintenance operation when he/she is dispatched to replenish/collect cash and replenish the consumables. The delivery plan calculating unit 34 makes the delivery plan instruction document instructing the operator to carry out the maintenance operation on other part when carrying out the maintenance operation on a certain part.

Figure 3:
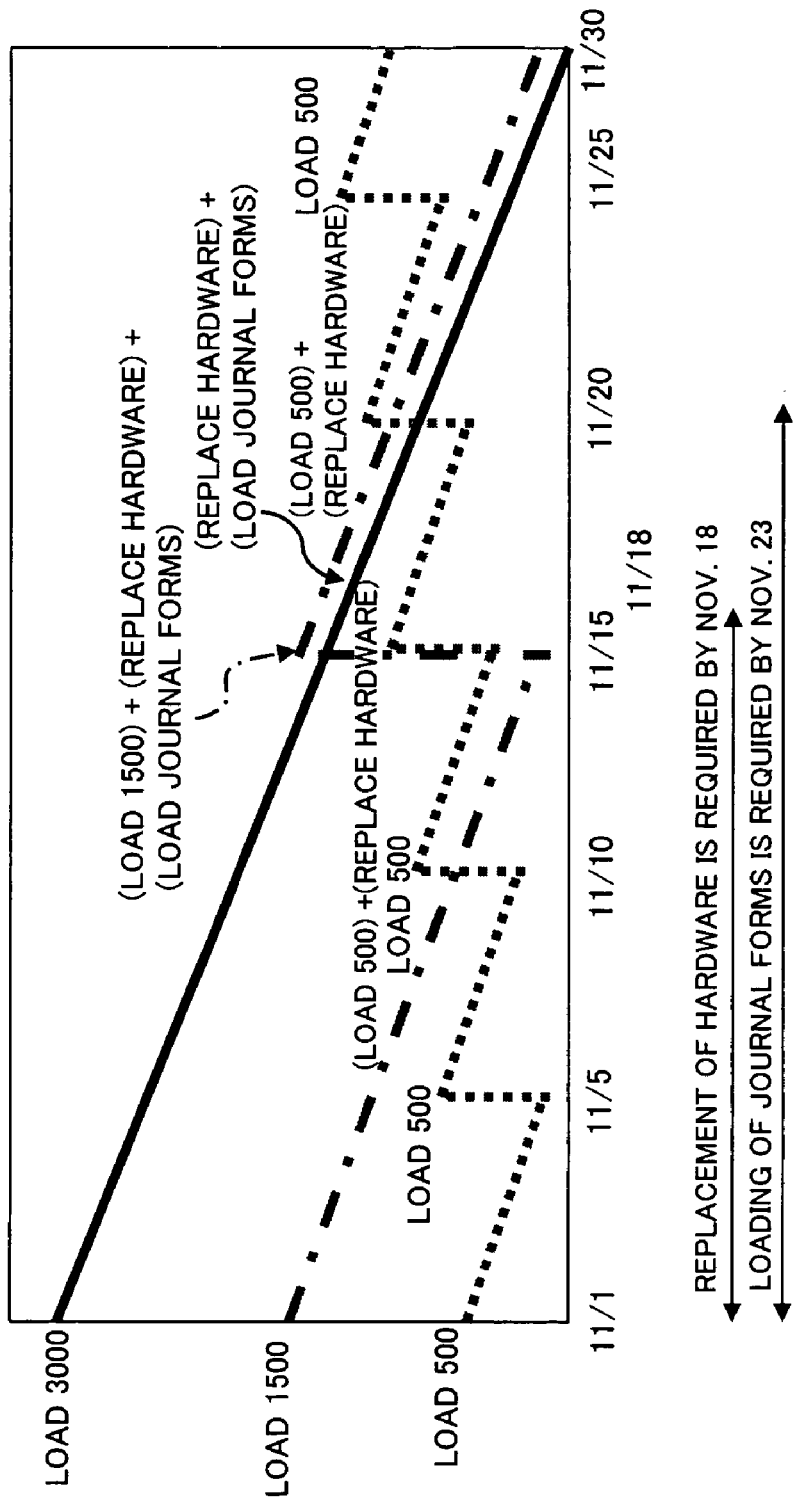
FIG. 3 is a diagram for illustrating a method for making a delivery plan instruction document in the dispatch operation plan devising system according to the embodiment of this invention.

FIG. 3 is a diagram for illustrating a manner of making the delivery plan instruction document in the dispatch operation plan devising system 1 according to the embodiment of this invention. Next, description will be made of a manner of making a delivery plan instruction document for certain November with reference to FIG. 3. In this example, there are used one ATM 10 and one kind of bills (10,000-yen bills), for the sake of convenience.

In this example, it is assumed that the ATM needs a hardware replacement of a bill unit apparatus by November 18. The part to be replaced can be procured by November 11. The amount of funds to be loaded required by the ATM 10 is 3,000 bills (cash), and 100 bills are paid as the amount of transactions per day. Further, loading of the journal forms (consumable) is required by November 23. The security company makes a contract of periodical dispatch once a month at a charge of 20,000 yen with the financial institution. The financial institution has to pay 5,000 yen for one dispatch on and after the second dispatch. The interest rate is 7%.

The delivery plan calculating unit 34 simulates the cost of dispatch of the operator and the surplus funds interest loss cost in each of three patterns of the delivery plan as below, and selects one in which the total cost is the smallest.

(1) Pattern 1 (Refer to a Solid Line in FIG. 3)

3,000 bills are loaded as the funds on November 1, and replacement of the hardware and loading of the journal forms are done on November 18 (the number of times of dispatch is two). The surplus funds interest loss cost is:

$$30{,}000{,}000 \text{ (yen)} \times 7 \text{ (\%)} \div 100 \div 366 \text{ (day/year)} \times 30 \text{ (day)} = 172{,}131 \text{ (yen)}$$

The security dispatch cost is:

$$20{,}000 \text{ (yen)} + 5{,}000 \text{ (yen)} \times 1 \text{ (time)} = 25{,}000 \text{ (yen)}$$

Accordingly, the total cost is the amount below.

$$172{,}131 \text{ (yen)} + 25{,}000 \text{ (yen)} = 197{,}131 \text{ (yen)}$$

(2) Pattern 2 (Refer to a Dash-dot Line in FIG. 3)

1,500 bills are loaded as the funds on November 1, 1,500 bills are loaded as the funds on November 15, and replacement of the hardware and loading of the journal forms are done on November 15 as well (the number of times of dispatch is two). The surplus funds interest loss cost is:

$$\{15{,}000{,}000 \text{ (yen)} \times 7(\%) \div 100 \div 366 \text{ (day/year)} \times 30 \text{ (day)}\} +$$
$$\{15{,}000{,}000 \text{ (yen)} \times 7(\%) \div 100 \div 366 \text{ (day/year)} \times 15 \text{ (day)}\} =$$
$$86{,}065 \text{ (yen)} + 43{,}032 \text{ (yen)} = 129{,}097 \text{ (yen)}$$

The security dispatch cost is:

$$20{,}000 \text{ (yen)} + 5{,}000 \text{ (yen)} \times 1 \text{ (time)} = 25{,}000 \text{ (yen)}$$

Accordingly, the total cost is the amount below:

129,097 (yen)+25,000 (yen)=154,097 (yen)

(3) Pattern 3 (Refer to a Broken Line in FIG. 3)

500 bills are loaded as the funds on November 1, 5, 10 and 25, and 500 bills are loaded as the funds and the hardware is replaced on November 15. 500 bills are loaded as the funds and the journal forms are loaded on November 20 (the number of times of dispatch is six). The surplus funds interest loss cost is:

$$\{5,000,000 \text{ (yen)} \times 7 \text{ (\%)} \div 100 \div 366 \text{ (day/year)} \times 30 \text{ (day)}\} +$$
$$\{5,000,000 \text{ (yen)} \times 7(\%) \div 100 \div 366 \text{ (day/year)} \times 25 \text{ (day)}\} +$$
$$\{5,000,000 \text{ (yen)} \times 7(\%) \div 100 \div 366 \text{ (day/year)} \times 20 \text{ (day)}\} +$$
$$\{5,000,000 \text{ (yen)} \times 7(\%) \div 100 \div 366 \text{ (day/year)} \times 15 \text{ (day)}\} +$$
$$\{5,000,000 \text{ (yen)} \times 7(\%) \div 100 \div 366 \text{ (day/year)} \times 10 \text{ (day)}\} +$$
$$\{5,000,000 \text{ (yen)} \times 7(\%) \div 100 \div 366 \text{ (day/year)} \times 5 \text{ (day)}\} =$$
$$28,688 \text{ (yen)} + 23,907 \text{ (yen)} + 19,125 \text{ (yen)} + 14,344 \text{ (yen)} +$$
$$9,562 \text{ (yen)} + 4,781 \text{ (yen)} = 100,407 \text{ (yen)}$$

The security dispatch cost is:

20,000 (yen)+5,000 (yen)×5 (time)=45,000 (yen)

Accordingly, the total cost is the amount below:

100,407 (yen)+45,000 (yen)=145,407 (yen)

As above, the delivery plan calculating unit 34 makes the delivery plan instruction document according to the pattern 3 in which the total cost is the cheapest among the above three patterns. Incidentally, since the surplus funds interest loss cost differs according to the interest rate at that time, and the security dispatch cost differs according to contents of a contract made between the financial institution and the security company, the delivery according to the above pattern (3) is not always optimum.

FIG. 4 is a diagram showing an example of the delivery person schedule database 39 in the dispatch operation plan devising system 1 according to the embodiment of this invention. The delivery person schedule database (dispatch history information) 39 is configured, as shown in FIG. 4, by relating a day of the last delivery to an idle condition of each delivery person. The delivery person schedule database 39 records dispatch history information on delivery persons of the security company.

In the example shown in FIG. 4, five delivery persons, A, B, C, D and E, are registered. For example, A did the last dispatch (delivery) on October 15 and can be dispatched on November 1 to 3, and 8 to 10.

The dispatch person scheduling unit 38 sets a delivery person (operator) to be dispatched on a delivery day set by the delivery plan calculating unit 34, setting a delivery person (operator) on the basis of information registered in the deliver person schedule database 39. The delivery person scheduling unit 38 functions as the operator selecting unit 15 for selecting at least one operator to carry out the dispatch operation among two or more candidates for the operator who can be the operator to carry out the dispatch operation (in this example, five persons: A, B, C, D and E) on the basis of the dispatch history information on the candidates for operator.

For example, the delivery person scheduling unit 38 preferentially selects a person who has not delivered (has not done the dispatch operation) for the longest period (days) since his/her last dispatch among delivery persons who can be dispatched on a delivery day set by the delivery plan calculating unit 34 on the basis of information registered in the delivery person schedule database 39.

Here is described a case where two delivery persons who can be dispatched on November 1 are selected by way of the example shown in FIG. 4. In the example shown in FIG. 4, persons who can be dispatched on November 1 are three: A, B and D. With regard to A, B and D, days that have elapsed since their last dispatches are 16, 1 and 31, respectively.

The delivery person scheduling unit 38 determines D, A and B as the delivery persons in the descending order of priorities. For the delivery day on November 1, D and A are selected as the delivery persons.

When two delivery persons who can be dispatched on November 10 are selected, persons who can be dispatched on November 10 are five: A, B, C, D and E. With respect to A, B, C, D and E, days that have elapsed since their last delivery are 10, 11, 46, 10 and 41, respectively.

From the above, the delivery person scheduling unit 38 determines C, E, B, A and D as the delivery persons in the descending order of priorities, so that C and E are selected as the delivery persons for the delivery day on November 10.

The delivery person scheduling unit 38 presents a made delivery plan as a perusable web page (web document) to a computer communicably connected thereto over the communication line (the Internet or the like) 44. Whereby, it becomes unnecessary to transmit the made delivery plan to a person concerned (for example, a person in charge of the security company) using a facsimile or the like, thereby to improve the business efficiency and decrease the load on a person in charge of the monitoring center 100.

The delivery person scheduling unit 38 may assign a person in charge to an area of each ATM 10 (the service office 102, the unattended store 103), and determine a delivery person for each area in the above manner, thereby to realize efficient delivery.

The delivery plan calculating unit 34 describes the name of a delivery person determined by the delivery person scheduling unit 38 in the delivery plan instruction document.

The delivery plan evaluating unit 41 (the evaluating unit 22) evaluates whether or not contents of a contract (contract forms) made between the financial institution and the security company are appropriate on the basis of a delivery plan made by the delivery plan calculating unit 34. For example, the delivery plan evaluating unit 41 evaluates whether or not the number of times of periodical delivery (the number of times of periodical dispatch) under contents of a contract made between the financial institution and the security company is appropriate if the delivery is operated according to the made delivery plan instruction document. The delivery plan evaluating unit 41 can call upon the financial institution to reconsider or anything the contents of the contract.

When the contract made between the financial institution and the security company (periodical dispatch contract) is that the security company dispatches five times (periodically dispatches) in a month at a constant charge of 20,000 yen and the financial institution has to pay an extra dispatch charge of 5,000 yen every dispatch on and after the sixth dispatch, examples of evaluation on three patterns are as follows.

(1) Pattern 1

When the calculated delivery plan instruction document instructs of three times of delivery, the financial institution has to pay a constant charge of 20,000 yen per month under the above contract. If the contract is changed to that the security company dispatches three times in a month at a constant charge of 10,000 yen and the financial institution has to pay an extra dispatch charge of 5,000 yen for every dispatch on and after the fourth dispatch, the amount to be paid will be 10,000 yen per month. Accordingly, the cost can be reduced by 10,000 yen per month.

(2) Pattern 2

When the calculated delivery plan instruction document instructs of nine times of delivery, the financial institution has to pay a constant charge of 20,000 yen per month and an extra dispatch charge of 20,000 yen (5,000×4), totaling 40,000 yen. If this contract is changed to that the security company dispatches nine times in a month at a constant charge of 30,000 yen, and the financial institution has to pay an extra dispatch charge of 5,000 yen every dispatch on and after the tenth dispatch, an amount to be paid will be 30,000 yen per month. Accordingly, the cost can be reduced by 10,000 yen per month.

As above, the delivery plan evaluating unit 41 evaluates whether or not contents of the contract made between the financial institution and the security company are appropriate on the basis of a delivery plan made by the delivery plan calculating unit 34.

The center monitoring apparatus 42 is communicably connected to each ATM 10 to monitor the ATM 10. When a trouble occurs in the ATM 10, the center monitoring apparatus 10 receives an output signal indicative of it from the ATM 10. When any trouble such as a fault occurs in the ATM 10 in conveying bills, the receipt forms or the like, the center monitoring apparatus 42 notifies a person in charge of the financial institution of it, and requests the security company 104 to dispatch the operator to solve the trouble.

When a trouble occurs in the ATM 10, the person in charge of the financial institution can examine contents of the trouble, and correct (compensate) the dispatch operation plan that has been made by means of the delivery plan compensating unit 36.

Meanwhile, the alarm outputting unit 35 in FIG. 2 has functions as the actual demand calculating unit 11 and the demand comparing unit 17 described above.

When it is determined that an actual demand for the replenishments is greater than an estimated demand, the alarm outputting unit 35 (the warning unit 18, the needlessness notifying unit 19) warns a person in charge of the financial institution of it. The alarm outputting unit 35 functions as the warning unit 18 described above.

When it is determined that the dispatch operation planned by the delivery plan calculating unit 34 is unnecessary, that is, when the ATM 10 is little used and an appropriate quantity of cash or the consumables remain in the ATM 10, and the maintenance operation for hardware replacement or the like is unnecessary, for example, the alarm outputting unit 35 (the needlessness notifying unit 19) notifies a person in charge of the financial institution, the security company or the manufacturer 105 that the dispatch operation is unnecessary.

The functions of the actual demand calculating unit 11 and the demand comparing unit 17 may be provided in a unit other than the alarm outputting unit 35, which is not limited to this embodiment but may be modified in various ways.

The delivery plan compensating unit 36 (the compensating unit 20) can compensate an enforcement plan made by the delivery plan calculating unit 34. A person in charge of the financial institution can compensate it at need by means of the delivery plan compensating unit 36. For example, when a trouble with funds raising occurs (for example, planned cash cannot be prepared), when a trouble with delivery person (operator) scheduling by the security company occurs (for example, a delivery person cannot be prepared at the time of dispatch) occurs, or anything, a person in charge of the financial institution changes the amount of funds to be delivered or the time to deliver the funds by means of the delivery plan compensating unit 36 to compensate the enforcement plan to one fitting to the actual operation. This can improve the serviceability.

The delivery plan setting retaining unit 40 retains an operation setting set according to the operation characteristics information on each ATM 10. The delivery plan calculating unit 34 can make a delivery plan (enforcement plan) most suitable for each ATM 10 on the basis of the operation setting retained in the delivery plan setting retaining unit 40. Meanwhile, the operation characteristics information is various characteristics occurring in operating each ATM 10, and is information as to, for example, busy time (date, day of the week, period of time) or a dull time (date, day of the week, period of time) of the ATM 10, which differs according to environments (a place) where the financial institution or the ATM 10 locates.

The delivery plan setting retaining unit 40 (the operation characteristics information retaining unit 14) retains setting that a delivery day (replenishment day) is set to a day before a busy day because payments become a large amount on the busy day before a pay day or at the end of a month, or that the delivery day is set to a day other than the delivery day because receipts become a large amount on the day after a repayment day, for example. Namely, the delivery plan setting retaining unit 40 is accomplished with a storage such as a hard disk or the like in a computer system.

The delivery route calculating unit 37 (the operation route calculating unit 21) calculates a route around a plurality of ATMs 10 on the basis of an enforcement plan made by the delivery plan calculating unit 34 in order to dispatch the operator to and have the operator operate at each of the plural ATMs 10, details of which will be described later. The delivery route calculating unit 37 can calculate a route on which the security company can dispatch the operator preferentially to an ATM 10 having a higher priority of the operation among a plurality of ATMs 10, that is, an ATM 10 having a high possibility that the funds or the consumables run out, or an ATM 10 that needs a quick maintenance and/or replacement, for example, and calculate a route on which the moving distance is shorter. In other words, the delivery route calculating unit 37 calculates the most suitable route of the operator of the security company on the basis of an enforcement plan made by the delivery plan calculating unit 34, whereby efficient operation is possible.

The delivery plan devising unit 30 is realized with a computer system (an information processing apparatus) having a server function, for example. A CPU (Central Processing Unit) of this information processing apparatus executes a program stored in a computer readable record medium (for example, a memory, a magnetic storage device, a flexible disk, a memory card, an magneto-optical storage, a CD-ROM, a CD-R, a CD-RW, a DVD, a DVD-R, a DVD-RW, etc.) to function as the demand estimation calculating unit 32 (the demand estimating unit 12), the preventive maintenance unit 33a (the abnormal information obtaining unit 13), the delivery plan calculating unit 34 (the enforcement plan making unit 16), the alarm outputting unit 35 (the warning unit 18), the delivery plan compensating unit 36 (the compensating unit 20), the delivery route calculating unit 37 (the operation route calculating unit 21), the delivery person scheduling unit 38 (the operator selecting unit 15) and the delivery plan evaluating unit 41 (the evaluating unit 22).

A program (a dispatch operation plan devising program) for realizing the demand estimation calculating unit 32 (the demand estimating unit 12), the preventive maintenance unit 33a (the abnormal information obtaining unit 13), the delivery plan calculating unit 34 (the enforcement plan making unit 16), the alarm outputting unit 35 (the warning unit 18), the delivery plan compensating unit 36 (the compensating unit 20), the delivery route calculating unit 37 (the operation route calculating unit 21), the delivery person scheduling unit 38 (the operator selecting unit 15) and the delivery plan evaluating unit 41 (the evaluating unit 22) is recorded on a computer readable record medium such as a flexible disk, a CD-ROM, a CD-R, a CD-R/W, a DVD, a DVD-R, a DVD-R/W, a magnetic disk, an optical disk, an magneto-optical disk or the like and provided. The computer reads the program from the record medium, transfers it to an internal storage or an external storage to store it therein, and uses it. The program may be recorded on a storage (record medium) such as a magnetic disk, an optical disk, a magneto-optical disk or the like, and provided to the computer from the storage over a communication route.

When the functions as the demand estimation calculating unit 32 (the demand estimating unit 12), the preventive maintenance unit 33a (the abnormal information obtaining unit 13), the delivery plan calculating unit 34 (the enforcement plan making unit 16), the alarm outputting unit 35 (the warning unit 18), the delivery plan compensating unit 36 (the compensating unit 20), the delivery route calculating unit 37 (the operation route calculating unit 21), the delivery person scheduling unit 38 (the operator selecting unit 15) and the delivery plan evaluating unit 41 (the evaluating unit 22) are realized, the program stored in the internal storage (a RAM or a ROM of a printer according to this embodiment) is executed by a micro processor of the computer (a CPU of the printer according to this embodiment). On this occasion, the computer may read the program recorded on the record medium, and execute it.

In this embodiment, a computer is a concept including hardware and an operating system, which signifies hardware operating under a control of the operating system. When the operating system is unnecessary and the application program solely operates the hardware, the hardware itself corresponds to the computer. The hardware comprises, at least, a microprocessor such as a CPU or the like and a means for reading a computer program recorded on a record medium. According to this embodiment, the delivery plan devising unit 30 or the center monitoring apparatus 42 has a function as the computer.

As the record medium in this embodiment, there can be used any one of an IC card, a ROM cartridge, a magnetic tape, a punched card, an internal storage of a computer (a memory such as a RAM or a ROM), an external storage, etc., or computer readable various media such as a printed matter on which a code such as a bar code or the like is printed, other than the above flexible disk, CD-ROM, CD-R, CD-R/W, DVD, DVD-R, DVD-R/W, magnetic disk, optical disk and magneto-optic disk.

The cash raining division 101 raises cash to be loaded in the ATM 10. The cash raising division 101 raises cash according to a delivery plan instruction document made by the delivery plan calculating unit 34, and deposits the cash into an account 106.

The security company 104 dispatches an operator to replenish the replenishments or carry out the maintenance operation at the ATM 10. When a trouble that can be solved only by a maintenance person of a manufacturer 105 occurs, for example, the security company 104 requests the manufacturer 105 to dispatch the maintenance person at need, dispatches the operator to the ATM 10 with the maintenance person of the manufacturer 105, and attends the maintenance person during the operation.

The manufacturer 105 carries out the maintenance operation at the ATM 10. In response to a dispatch request from the security company 104, the manufacturer 105 dispatches the maintenance person to the ATM 10.

The manufacturer 105 has a preventive maintenance unit 33b having a similar function of the preventive maintenance unit 33a provided in the monitoring center 100. The manufacturer 105 can thereby obtain a sign (abnormal information) of apparatus abnormality of the ATM 10, classify the obtained abnormal information according to each function block, analyze the number of times of occurrence of the abnormal information and the degree of importance of the error in each function block, calculate the time to replace or repair a hardware part. Accordingly, the manufacturer 105 can request the monitoring center 100 or the security company 104 to dispatch the operator for the maintenance operation at the ATM 10.

Figure 5:
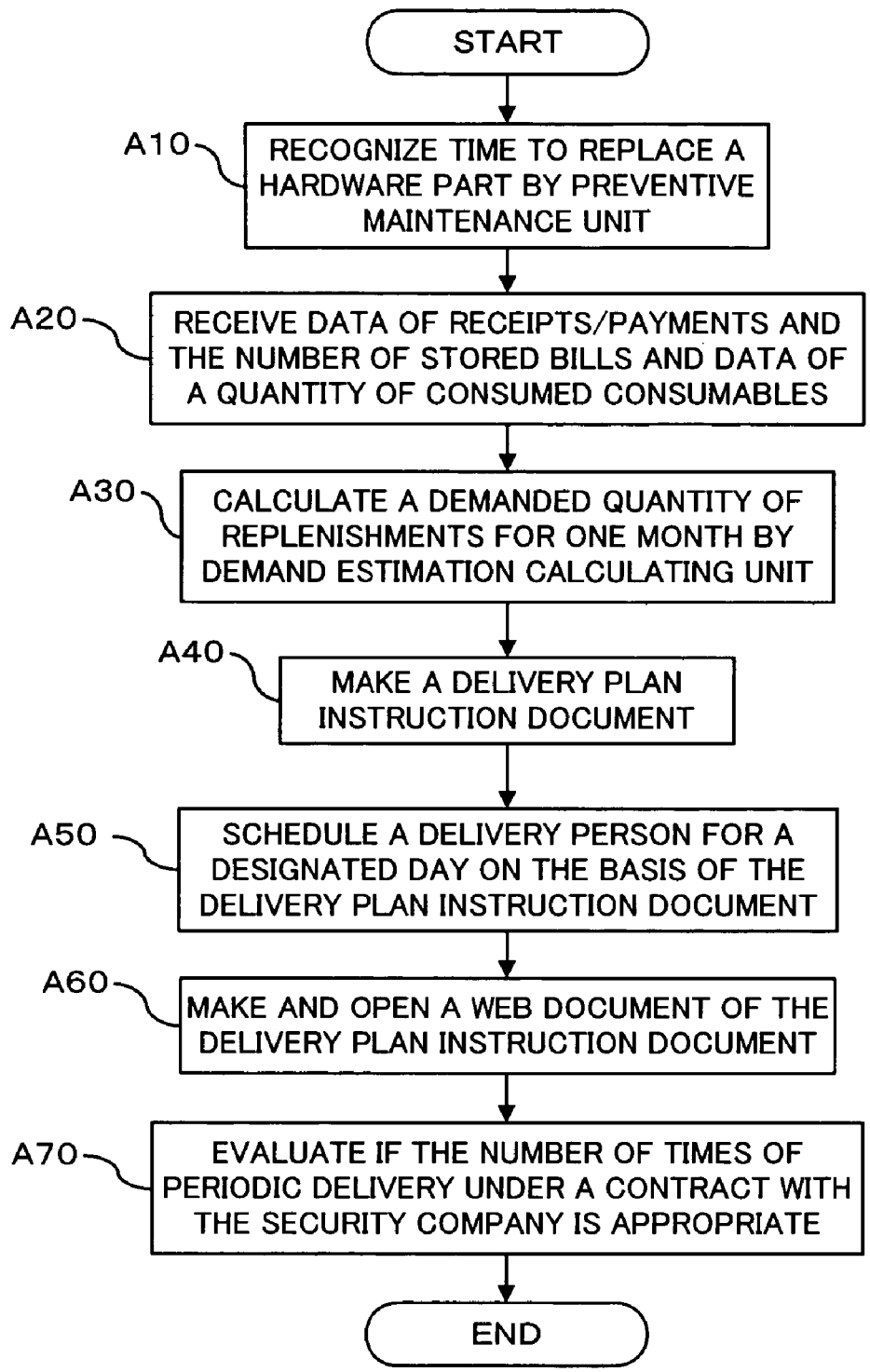
FIG. 5 is a flowchart for illustrating a method of devising a dispatch operation plan by a delivery plan devising unit of the dispatch operation plan devising system according to the embodiment of this invention.

Next, a method of devising a dispatch operation plan by the delivery plan devising unit 30 in the dispatch operation plan devising system 1 according to this invention will be described with reference to a flowchart (steps A10 to A70) shown in FIG. 5.

The preventive maintenance unit 33a obtains abnormal information transmitted from each ATM 10, analyzes the number of times of occurrence of the abnormal information and the degree of importance of the error on the basis of the abnormal information, and calculates the time to replace a hardware part (step A10). The demand estimation calculating unit 32 obtains information about data of received/paid money and the number of stored bills, and the quantity of used consumables from each ATM 10 (step A20).

The demand estimation calculating unit 32 calculates the quantity of a demand for the replenishments (cash, consumables) necessary within a predetermined period (one month) on the basis of information recorded in the demand estimation database 31 (step A30).

The delivery plan calculating unit 34 makes a delivery plan instruction document on the basis of the interest cost of surplus funds, the number of bills to be loaded, the time to load cash, the time to load consumables and the time to replace a maintenance part so that the total operation cost is minimum (step A40). The delivery person scheduling unit 38 refers to the delivery person schedule database 39 to determine (schedule) (a) delivery person(s) according to the made delivery plan instruction document (step A50).

The delivery plan devising unit 30 converts the made delivery plan instruction document into web data (web document), and presents it to a computer communicably connected thereto over the communication line such as the Internet or the like, so that the computer can peruse the same (step A60).

In the financial institution, the cash raising division (not shown) peruses the web page made at the step A60 to refer to the delivery plan instruction document, and deposits an instructed amount of cash in a predetermined account on a day before the delivery day (at least before the delivery) The security company peruses the web page made at the step A60 to refer to the delivery plan instruction document, withdraws an instructed amount of cash from the predetermined account, dispatches the operator(s) to a designated ATM 10, and replenishes and/or collects cash. At the same time, the operator(s) of the security company replenishes/replaces the consumables, and carries out the hardware maintenance operation. A person in charge of the financial institution evaluates contents of the operation (actual results) by means of the delivery plan evaluating unit 41 (step A70).

In the above flowchart, the order of the steps A10 and A20 is not limited to this example, but the step A20 may be before the step A10, which can be modified in various ways without departing from the scope of this invention.

Figure 6:
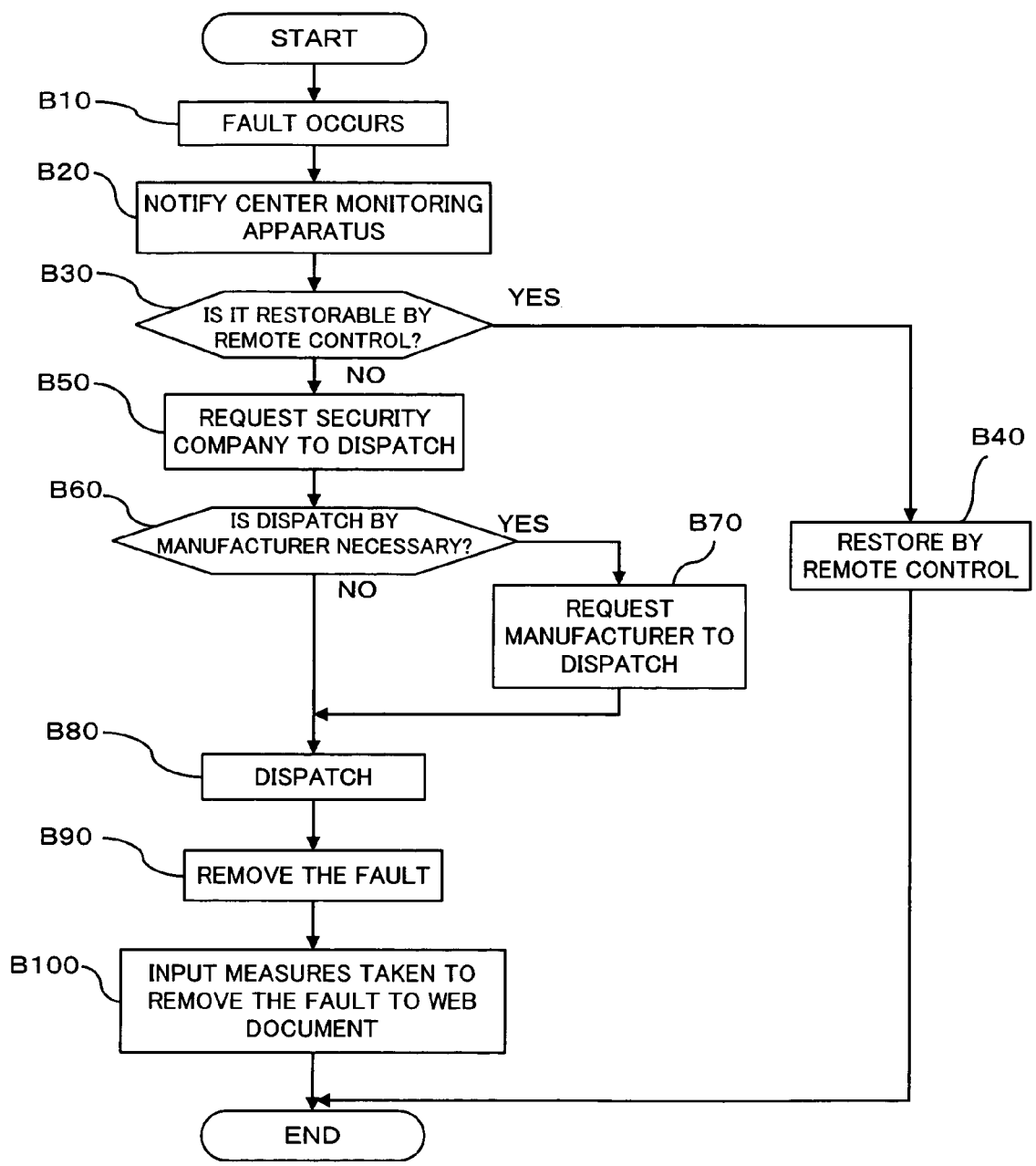
FIG. 6 is a flowchart for illustrating a process carried out when an unexpected (outside the plan) fault occurs in the dispatch operation plan devising system according to the embodiment of this invention.

Next, a process carried out when an unexpected fault (that is, outside the plan) occurs in the dispatch operation plan devising system 1 according to the embodiment of this invention will be described with reference to a flowchart (steps B10 to B100) shown in FIG. 6.

When a fault occurs in the ATM 10 (step B10) this fault is communicated to the center monitoring apparatus 42 in the monitoring center 100 using a self-diagnostic function of the ATM 10 or from a customer by using a call phone provided to the ATM 10 (step B20).

The center monitoring apparatus 42 determines whether or not the fault can be resolved by a remote operation (control) from the monitoring center 100 (step B30). When the fault can be resolved by the remote control (refer to YES route at step B30), the fault is resolved by the remote control (step B40), and the process is terminated.

When the fault cannot be resolved by the remote control (refer to NO route at step B30), the center monitoring apparatus 42 requests the security company 102 to dispatch the operator(s) (step B50). The security company 102 determines whether the security company 102 can resolve the fault by itself or the fault needs a repair by the manufacturer (step B60). When the security company determines that an operation by a maintenance person of the manufacturer is unnecessary (refer to NO route at step B60), the security company 102 dispatches the operator(s) to the ATM 10 (step B80).

When the security company 102 determines that the operation by the maintenance person of the manufacturer is necessary (refer to YES route at step B60), the security company 102 requests the manufacturer to dispatch the maintenance person (step B70), and the maintenance person of the manufacturer is dispatched to the ATM 10 (step B80).

At the ATM 10, the operator of the security company 104 or the maintenance person of the manufacturer removes the fault of the ATM 10 (step B90). The security company 104 inputs contents of the operation or the like carried out as measures to remove the fault from the web document (step B100), and terminates the process.

According to the dispatch operation plan devising system 1 of this embodiment of this invention, the delivery plan calculating unit 34 makes an enforcement plan for the dispatch operation on the basis of a result of demand estimation by the demand estimation calculating unit 32 so that the cost for dispatch of (an) operator(s) of the security company 104 is minimized. It is thereby possible to reduce the operation cost, and improve the business efficiency.

In the monitoring center 100, it is possible to devise a dispatch operation plan for all ATMs 10 installed in the service office 102 and unattended store 103, and make a delivery plan instruction document without relying on experiences and perception of a person in charge of each service office 102. Accordingly, it is possible to reduce the business load on the person in charge of the service office 102, and save the employment cost.

By decreasing the number of times of dispatch by the security company 104, it is possible to reduce the dispatch cost to be paid to the security company 104, reduce the interest loss of surplus funds generating in the ATM 10, and reduce the operation cost.

The delivery plan calculating unit 34 makes an operator dispatch operation plan of the security company on the basis of an estimated demand for the replenishments by the demand estimation calculating unit 32 or prediction of the maintenance operation by the preventive maintenance unit 33a, not coping with a fault such as lack of the replenishments (for example, lack of cash or near end/end of a medium) or the like in the ATM 10 after the fault occurs, thereby to efficiently dispatch the operator of the security company 104. It is thus possible to avoid wasteful dispatch, and reduce the dispatch cost.

When the operator is dispatched to the ATM 10, the operator can carry out the maintenance operation such as replacement of a hardware part along with replenishment/collection of cash and the consumables, so that the number of times of dispatch by the security company can be decreased and the dispatch cost can be reduced.

When it is determined that the dispatch operation planned by the delivery plan calculating unit 34 is unnecessary, the alarm outputting unit (the needlessness notifying unit 19) notifies a person in charge or the like of the financial institution that the dispatch operation is unnecessary, thereby avoiding wasteful dispatch by the security company 104 and reduce the dispatch cost.

The preventive maintenance unit 33a obtains abnormal information transmitted from each ATM 10, and calculates the time to replace a hardware part on the basis of the abnormal information. The delivery plan calculating unit 34 makes a delivery plan so as to dispatch the operator of the security company 104 or the maintenance person of the manufacturer on the occasion of the replacement (prediction of the maintenance operation). Whereby, the security company 104 and/or the manufacturer 105 can beforehand plan dispatch for the maintenance operation to improve the operation efficiency. Moreover, the security company 104 and the manufacturer 105 do not need to arrange the schedule for the dispatch between them, which is helpful to reduce the communication cost or the like for a liaison of this.

The delivery plan setting retaining unit 40 and the delivery plan calculating unit 34 can make an enforcement plan adapted to the operation and characteristics of each ATM 10, which enables flexible operations adapted to the operational characteristics of each ATM 10.

The delivery plan compensating unit 36 can correct (compensate) the delivery plan instruction document to make an efficient delivery plan. When the characteristics according to a place or the like where each ATM 10 is installed cannot be systematically detected, that is, when the quantity of demand data necessary for estimation is small (or not enough), it is possible to compensate the delivery plan according to the operation of each ATM 10, which enables a highly-accurate operation of each ATM 10.

It is possible to compensate and increase the number of times of delivery of cash to a store or an ATM 10 at which the funds operation has to be kept at a high degree or running out of the funds is undesirable. Similarly, it is possible to compensate and decrease the number of times of delivery of cash or the amount of funds to be loaded for a busy time. This enables each ATM 10 to be operated safely.

The delivery plan calculating unit 34 describes the name(s) of (a) delivery person(s) determined by the delivery person scheduling unit 38. This is helpful to avoid a mistake as to (a) person(s) in charge, or delivery.

The delivery person scheduling unit 38 preferentially selects, as the operator, an operator candidate who has been dispatched a less number of times, or an operator candidate who has not been dispatched for a longer time since his/her last dispatch among a plurality of operator candidates on the basis of the dispatch history information stored in the delivery person schedule database 39, which enables efficient setting of the operator.

By using the dispatch operation plan devising system, it is possible to deliver cash and/or the consumables or carry out the regularly occurring maintenance operation more intentionally according to a delivery plan instruction document beforehand made. The monitoring center 100 can thus devote to cope with a fault unexpectedly occurring, so that the load on the operator can be decreased and the business can be done more efficiently.

The alarm outputting unit 35 calculates an actual demand for the replenishments on the basis of an actual transaction situation at the ATM 10, and compares the actual demand for the replenishments with an estimated demand for the replenishments by the demand estimation calculating unit 32. When it is determined that the actual demand for the replenishments is greater than the estimated demand, the alarm outputting unit 35 generates a warning. When a difference occurs between the delivery plan of funds and/or the consumables to be loaded in the ATM 10 and the demand for the funds and/or the replenishments in actual transactions generates during the operation according to the made delivery plan, and the funds and/or the consumables possibly run out in case the operation is continued, or when it is impossible (or unnecessary) to replenish all the funds or the consumables planned to the ATM 10, the alarm outputting unit 35 notifies a person in charge of the financial institution of an alarm to call his/her attention, and has him/her reconsider the made delivery plan instruction document. Whereby, it is possible to make a delivery plan instruction document coping with the actual operation, improve the reliability, and beforehand prevent the ATM 10 from stopping.

The delivery plan calculating unit 34 makes a delivery plan (enforcement plan) on the basis of an operation setting retained in the delivery plan setting retaining unit 40, thereby making a delivery plan most suitable for each ATM 10.

(B) Description of Operation Route Calculating Unit

Hereinafter, description will be made of a delivery route management system suitable for use as the delivery route calculating unit (the operation route calculating unit 21) of the dispatch operation plan devising system 1 according to the embodiment of this invention.

Figure 7:
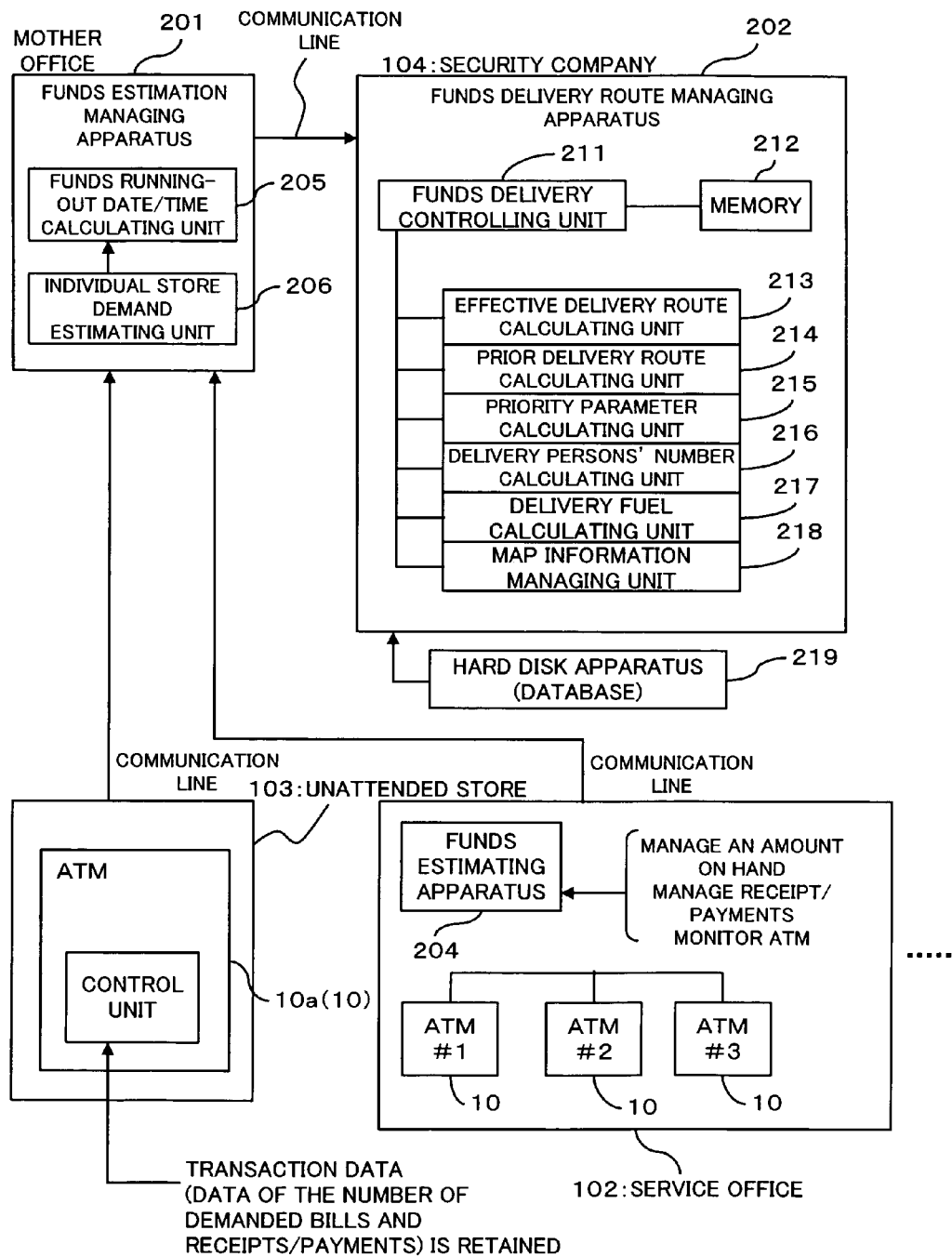
FIG. 7 is a diagram showing a system structure of a delivery route management system suitable for use as a delivery route calculating unit of the dispatch operation plan devising system according to the embodiment of this invention.

§ 1: Description of System and Each Apparatus (1) Description of Structure of System FIG. 7 is a diagram showing a structure of a delivery route management system suitable for use as the delivery route calculating unit 37 of the dispatch operation plan devising system 1 according to the embodiment of this invention. This system includes a funds estimation managing apparatus and a funds delivery route managing apparatus. The funds estimation managing apparatus of a main office is inputted thereto data of the amount of receipts/payments and the number of stored bills per unit time of each store (an attended store or an unattended store such as a service office or the like) of a financial institution such as a bank, and estimates funds of the store on the basis of the inputted data. The funds delivery route managing apparatus is inputted thereto data of a result of the estimation by the funds estimation managing apparatus, calculates a funds delivery route for delivering funds to be replenished to each store on the basis of the inputted data, and manages the delivery. A more practical example of the system is as follows.

As shown in FIG. 7, this system is an example of a system configured by connecting, over communication lines, store apparatuses (ATMs 10, a funds estimating apparatus, etc.) installed in a service office (an attended store) 102 and an unattended store 103 of a financial institution such as a bank, a funds estimation managing apparatus 201 installed in a mother office, the funds delivery route managing apparatus 202, etc. This system estimates funds per unit time according to the demand for funds at the service offices 102 or the unattended stores 103 of the financial institution such as a bank, and delivers the funds thereto.

In this system, there are installed a plurality of ATMs 10 (#1, #2, #3, and so on) and a transaction apparatus for window job (not shown) in each service office 102 (for example, A store, B store, C store, and so on) of a financial institution such as a bank, and customer transaction are carried out at these ATMs 10, the transaction apparatus for window job, etc. In each service office 102, there is installed the funds estimating apparatus 204 (an apparatus configured with an arbitrary computer such as a work station, a personal computer, or the like). The funds estimating apparatus 204 monitors, analyzes or anything management of the number of stored bills, management of the amount of receipts/payments, and the plural ATMs 10.

The ATM 10a is installed in the unattended store 103 (one or a plurality of stores) controlled by the service store 102. Hereinafter, an ATM 10 installed in the unattended store is designated by a reference number 10a. The ATM 10a in the unattended store 103 is managed by a person in charge or the like of any one of the service offices 102. Transaction data (data of the number of stored bills, the amount of receipts/payments, etc.) is stored in a control unit of the ATM 10a installed in the unattended store 103.

The funds estimation managing apparatus 201 is installed in the mother office to estimate and manage funds in each store on the basis of the amount of receipts/payments and the number of stored bills (data of receipt/payments, data of the number of stored bills, etc.) per unit time transmitted from each store (the service office 102 or the unattended store 103). The funds estimation managing apparatus 201 comprises an individual store demand estimating unit 206 for estimating the demand for funds at each store on the basis of the amount of income/expense and the number of stored bills (data of receipts/payments, data of the number of stored bills, etc.) per unit time from each store, and a funds running-out date/time calculating unit 205 for calculating the date/time when the funds will run out on the basis of a result of estimation from the individual store demand estimating unit 206. The individual store demand estimating unit 206 and the funds running-out date/time calculating unit 205 are configured with a program, whose functions can be realized by executing the program.

The funds delivery route managing apparatus 202 of a security company 104 that is requested (contracts) for a funds delivery job or the like from the mother office comprises a funds delivery controlling unit 211, a memory 212, an efficient delivery route calculating unit 213, a prior delivery route calculating unit 214, a priority parameter managing unit 215, a delivery persons' number calculating unit 216, a delivery fuel calculating unit 217, a map information managing unit 218, etc. A hard disk apparatus 219 is connected to the funds delivery route managing apparatus

202. A database (storing data such as map data, priority parameter, etc.) is stored in the hard disk apparatus 219.

The funds delivery controlling unit 211 is configured with a processor such as a CPU or the like. The funds delivery controlling unit 211 executes a program beforehand stored in a storage (for example, a hard disk apparatus) to carry out various processes and controls in the apparatus. The memory 212 is configured with a writable memory (for example, a RAM) to which the funds delivery controlling unit 211 and the like access. When receiving data from the funds estimation managing apparatus 201 of the mother office, the funds delivery controlling unit 211 stores the received data in the memory 212.

The efficient delivery route calculating unit 213 has a function of calculating an efficient route to a store where the funds will run out from map information (information stored in the hard disk apparatus 219) retrieved by the map information managing unit 218, and determining the delivery route in order to deliver the funds. The prior delivery route calculating unit 213 has a function of giving priorities to stores to be delivered, and calculating a delivery route around the stores in the order of their priorities.

The delivery persons' number calculating unit 216 has a function of calculating the number of delivery persons from the number of delivery days and the number of times of delivery within a period of time. The delivery fuel calculating unit 217 has a function of calculating the fuel cost of a funds delivery vehicle to be consumed on the delivery route within a certain period of time. The priority parameter managing unit 215 has a function of storing a priority parameter of a delivery route inputted by a person in charge in the hard disk apparatus 219, and managing (retrieving, updating or anything) it. The map information managing unit 218 has a function of managing (retrieving, updating or anything) map information on stores to be delivered funds in the database stored in the hard disk apparatus 219.

(2) Description of Processes in System

Processes in the above system are as follows.

In each service office 102, the funds estimating apparatus 204 manages transaction data at the ATMs 10, a transaction apparatus for the window job and the like in the store (manages the number of stored bills, manages received/paid money per unit time of each apparatus), and monitors the ATMs 10. The funs estimating apparatus 204 transmits transaction data managed thereby to the funds estimation managing apparatus 201 of the mother office over a communication line.

A control unit of the ATM 10*a* installed in the unattended store 103 controls so that transaction data (data of the number of stored bills, receipts/payments, etc.) of the ATM 10*a* is retained. The ATM 10*a* transmits the transaction data stored in the control unit thereof to the funds estimation managing apparatus 201 of the mother office from the ATM 10*a* over a communication line.

When receiving the transaction data from the funds estimating apparatus 204 of the service office 102 and the transaction data of the ATM 10*a* in the unattended store 103, the individual store demand estimating unit 103 of the funds estimation managing apparatus 201 in the mother office estimates the demand for funds per unit time of each store on the basis of the received transaction data, and sends data of a result of the estimation to the funds running-out date/time calculating unit 205. When receiving the data, the funds running-out date/time calculating unit 205 calculates the date/time when the funds will run out on the basis of the data.

When the funds running-out date/time calculating unit 205 in the mother office calculates the date/time when the funds will run out, the funds estimation managing apparatus 201 in the mother office sends data of a result of the estimation including the date/time when the funds will run out to the funds delivery route managing apparatus 202 of the security company 104, and requests the security company 104 to deliver the funds to be replenished (a request based on a contract).

When the funds delivery route managing apparatus 202 of the security company 104 receives the data from the funds estimation managing apparatus 201 in the mother office, the funds delivery controlling unit 211 temporarily stores the received data in the memory 212, and calculates and determines a delivery route under the control thereof.

In this process, the efficient delivery route calculating unit 213 calculates an efficient delivery route on the basis of the received data (including the date/time when the funds will run-out) stored in the memory 212 and map information from the map information managing unit 218. The prior delivery route calculating unit 214 gives priorities to stores to be delivered the funds on the basis of the received data (including the date/time when the funds will run out) stored in the memory 212, the map information from the map information managing unit 218 and the priority parameter from the priority parameter managing unit 215, and calculates a funds delivery route around the stores in the order of their priorities.

The delivery persons' number calculating unit 216 calculates the number of delivery persons from the number of days and the number of times of delivery per unit time on the basis of a result of the calculation by the efficient delivery route calculating unit 213 and a result of the calculation by the prior delivery route calculating unit 214. The delivery fuel calculating unit 217 calculates the fuel cost of a funds delivery vehicle on a delivery route per unit time on the basis of a result of the calculation by the efficient delivery route calculating unit 213 and a result of the calculation by the prior delivery route calculating unit 214.

A delivery route for replenishing the funds to the stores is determined on the basis of information calculated by the above units under a control of the funds delivery controlling unit 211. Thereafter, delivery of the funds is started along the determined delivery route.

(3) Example of Calculation by Each Calculating Unit

Next, description will be made of an example of calculation by each calculating unit in the mother office's side apparatus and the security company's side apparatus.

① Example of Calculation By the Funds Running-out Date/Time Calculating Unit 205

The funds running-out date/time calculating unit 205 of the funds estimation managing apparatus 201 calculates as follows, for example. If the number of stored bills at present (for example, 10:00 a.m., Dec. 3, 2001) is 10,000 tens and the number of demanded bills during one-day operation time (for example, 12 hours) is 2,500 tens, the number of stored bills will be zero in four days. In which case, the funds running-out date/time calculating unit 205 works out data of "10:00 a.m., Dec. 7, 2001," which is four days after, as an estimated value which predicts running-out of the funds.

② Example of Calculation By the Prior Delivery Route Calculating Unit 214

The prior delivery route calculating unit 214 of the funds delivery route managing apparatus 202 calculates as follows, for example. The prior delivery route calculating unit 214 calculates a prior delivery route using priority parameters (data stored in the database of the hard disk apparatus 219) managed by the priority parameter managing unit 215.

For example, the prior delivery route calculating unit 214 calculates a delivery route according to the priority parameters, P1, P2 and P3, shown below. The priority parameters, P1, P2 and P3, in this case are as follows.

P1: determine a delivery route in the order in which the funds will run out earlier;

P2: the above P1, and determine the delivery route in the order in which the moving distance is shorter; and P3: determine the delivery route in the order in which the moving distance is shorter.

The priority parameter managing unit 215 beforehand stores (registers) the above priority parameters in the database of the hard disk apparatus 219 on the basis of inputted information (data manually inputted). When prior delivery route calculating unit 214 calculates, the priority parameter managing unit 215 retrieves a relevant one, and uses it.

③ Example of Calculation By the Delivery Persons' Number Calculating Unit 216

The delivery persons' number calculating unit 216 calculates the number of delivery persons per month from the number of times of occurrence that the funds will run out per month calculated by the funds running-out date/time calculating unit 205 and the number of delivery persons for one delivery.

④ Example of Calculation By the Delivery Fuel Calculating Unit 217

The delivery fuel calculating unit 217 calculates necessary fuel (litters) from a total delivery distance in one delivery operation and a running distance per litter of the delivery vehicle on the basis of distance information between the stores of the map information managed by the map information managing unit 218 and a delivery route determined by the efficient delivery route calculating unit 213 and the prior delivery route calculating unit 214. The delivery fuel calculating unit 217 also calculates a delivery fuel cost per month on the basis of the above calculated data.

Figures 8A, 8B:
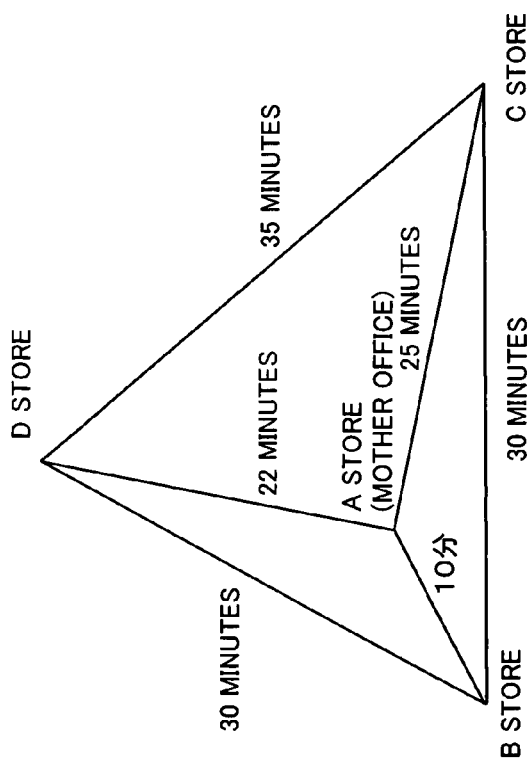
FIGS. 8(A) and 8(B) are diagrams showing an example of calculation of the most suitable delivery route by a delivery route management system suitable for use as the delivery route calculating unit of the dispatch operation plan devising system according to the embodiment of this invention.

§ 2: Description of Example of Conditions Under Which the Most Suitable Delivery Route is Calculated FIGS. 8(A) and 8(B) show an example of conditions under which the most suitable delivery route is calculated by the delivery route calculating unit. Now, description will be made of an example of conditions under which the most suitable delivery route is calculated with reference to FIGS. 8(A) and 8(B). An example to be described below is a process carried out in the funds delivery route managing apparatus 202 installed in the security company.

(1) Funds Delivery Route Calculation Conditions

Conditions under which a funds delivery route is calculated in the following example are as follows:

① Stores are four: A (mother office), B, C and D;

② One delivery vehicle delivers funds from A store (mother office);

③ The present date/time is 10:00 a.m., Dec. 3 (Monday), 2001;

④ Dates/times when the funds will run out estimated by the funds estimation managing apparatus 201 in the mother office are as follows:

The funds will run out 90 minutes after at B store [12:00 p.m., Dec. 3 (Monday), 2001]

The funds will run out 30 minutes after at C store [10:30 a.m., Dec. 3 (Monday), 2001]; and The funds will run out 120 minutes after at D store [12:30 p.m., Dec. 3 (Monday), 2001].

⑤ Positional relationships (moving times) among the stores are as shown in FIG. 8(A).

In the example shown in FIG. 8(B), the moving time from A store to B store (A-B) is 10 minutes, the moving time from A store to C store (A-C) is 25 minutes, the moving time from A store to D store (A-D) is 22 minutes, the moving time from B store to A store (B-A) is 10 minutes, the moving time from B store to C store (B-C) is 30 minutes, the moving time from B store to D store (B-D) is 35 minutes, the moving time from C store to A store (C-A) is 25 minutes, the moving distance from C store to B store (C-B) is 30 minutes, the moving time from C store to D store (C-D) is 35 minutes, the moving time from D store to A store (D-A) is 22 minutes, the moving time from D store to B store (D-B) is 30 minutes, and the moving time from D store to C store (D-C) is 35 minutes.

Positional information on the stores shown in FIG. 8(A) and data in the moving time table shown in FIG. 8(B) are beforehand stored as map information in the database of the hard disk apparatus 219. The map information managing unit 218 carries out processes such as updating, adding, retrieving or anything of the map information.

Figure 9:
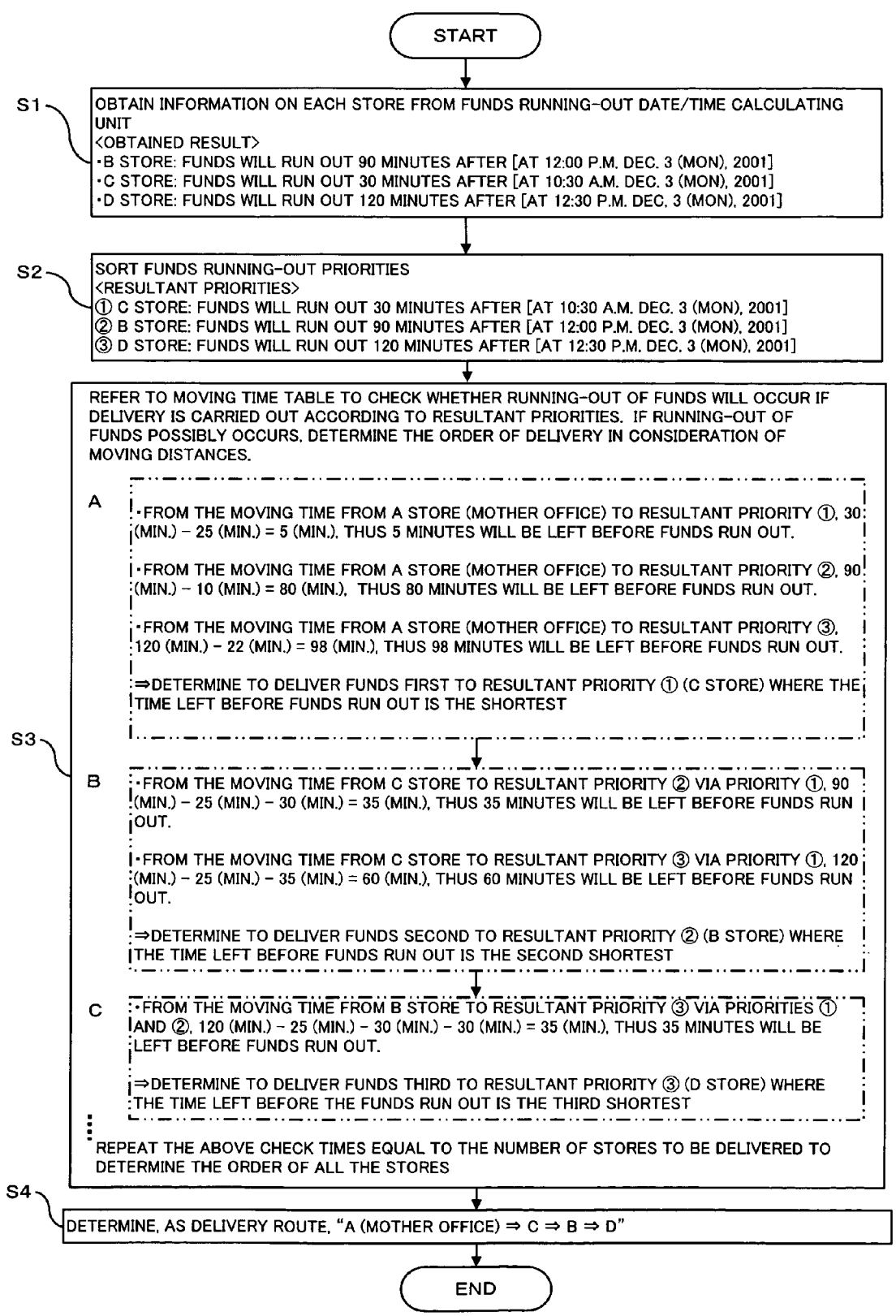
FIG. 9 is a flowchart for illustrating calculation of the most suitable delivery route by a delivery route management system suitable for use as the delivery route calculating unit of the dispatch plan devising system according to the embodiment of this invention.

§ 3: Description of Process of Calculating the Most Suitable Delivery Route with Reference to Flowchart FIG. 9 is a flowchart of a process of calculating the most suitable delivery route by a delivery route management system suitable for use as a delivery route calculating unit of the dispatch operation plan devising system according to the embodiment of this invention. Next, description will be made of the most suitable delivery route calculating process with reference to FIG. 9. Incidentally, S1 to S4 indicate processing steps.

In the funds estimation managing apparatus 201 in the mother office, the individual store demand estimating unit 206 estimates the demand for funds at each store on the basis of inputted data (the amount of receipts/payments and the number of stored bills per unit time) from each store (the service office 102, the unattended store 103, etc.), and transmits data of a result of the estimation to the funds running-out date/time calculating unit 205. The funds running-out date/time calculating unit 205 calculates the date/time when the funds will run out on the basis of the data from the individual store demand estimating unit 206, and transmits data of a result of the calculation (data of a result of estimation of the date/time when the funds will run out at each store) to the funds delivery route managing apparatus 202 of the security company 104.

In the funds delivery route managing apparatus 202 in the security company 104, the funds delivery controlling unit 211 receives data from the funds estimation managing apparatus 201 in the mother office. In this case, the funds delivery route managing apparatus 202 in the security company 104 obtains funds running-out date/time data calculated by the funds running-out date/time calculating unit 205 in the mother office (step S1). The funds delivery route managing apparatus 202 temporarily stores the received data in the memory 212. The obtained results are as follows:

① The funds will run out at B store 90 minutes after [at 12:00 p.m. Dec. 3 (Monday), 2001];

② The funds will run out at C store 30 minutes after [at 10:30 a.m. Dec. 3 (Monday), 2001];

③ The funds will run out at D store 120 minutes after [at 12:30 p.m. Dec. 3 (Monday), 2001];

Next, the efficient delivery route calculating unit 213 sorts priorities as to running-out of the funds under a control of the funds delivery controlling unit 211 (step S2). Resultant priorities obtained by this process are as follows:

④ The funds will run out at C store 30 minutes after [at 10:30 a.m. Dec. 3 (Monday), 2001];
⑤ The funds will run out at B store 90 minutes after [at 12:00 p.m. Dec. 3 (Monday), 2001];
⑥ The funds will run out at D store 120 minutes after [at 12:30 p.m. Dec. 3 (Monday), 2001].

The efficient delivery route calculating unit 213 refers to the moving time table [refer to FIG. 8(B)] managed by the map information managing unit 218, and checks whether or not the funds will run out when the funds are delivered according to the resultant priorities. When the funds will run out if the funds are delivered according to the resultant priorities, the efficient delivery route calculating unit 213 determines the order in consideration of the moving distances on the delivery route (information in the hard disk apparatus 219 managed by the map information managing unit 218) (step S3). Details of this are as follows:

A-1: Five minutes will be left before the funds run out because "30 (minutes)−25 (minutes)=5 (minutes)" as calculated from the moving time from A store (mother office) to the resultant priority ①;

A-2: 80 minutes will be left before the funds run out because "90 (minutes)−10 (minutes)=80 (minutes)" as calculated from the moving time from A store (mother office) to the resultant priority ②;

A-3: 98 minutes will be left before the funds run out because "120 (minutes)−22 (minutes)=98 (minutes)" as calculated from the moving time from A store (mother office) to the resultant priority ③.

As a result, it is determined to deliver the funds first to a store given the priority ① (C store) at which the time left before the funds run out is the shortest.

B-1: 35 minutes will be left before the funds run our because "90 (minutes)−25 (minutes)−30 (minutes)=35 (minutes)" as calculated from the moving time from C store to the resultant priority ② via the priority ①;

B-2: 60 minutes will be left before the funds run out because "120 (minutes)−25 (minutes)−35 (minutes)=60 (minutes)" as calculated from the moving time from C store to the resultant priority ③ via the priority ①.

In consequence, it is determined to secondly deliver the funds to the resultant priority ② (B store) at which the time left before the funds run out is the second shortest.

C-1: 35 minutes will be left before the funds run out because "120 (minutes)−25 (minutes)−30 (minutes)−30 (minutes)=35 (minutes)" as calculated from the moving time from B store to the resulting priority ③ via the priorities ① and ②.

In consequence, it is determined to deliver the funds third to the resultant priority ③ (D store) at which the time left before the funds run out is the third shortest. The above process is repeated the number of times equal to the number of the stores to determine the order of all stores to be delivered the funds. As a result, "A store (main office) to C store to B store to D store" is determined as the delivery route (step S4).

§4: Example of Funds Delivery

Figure 10:
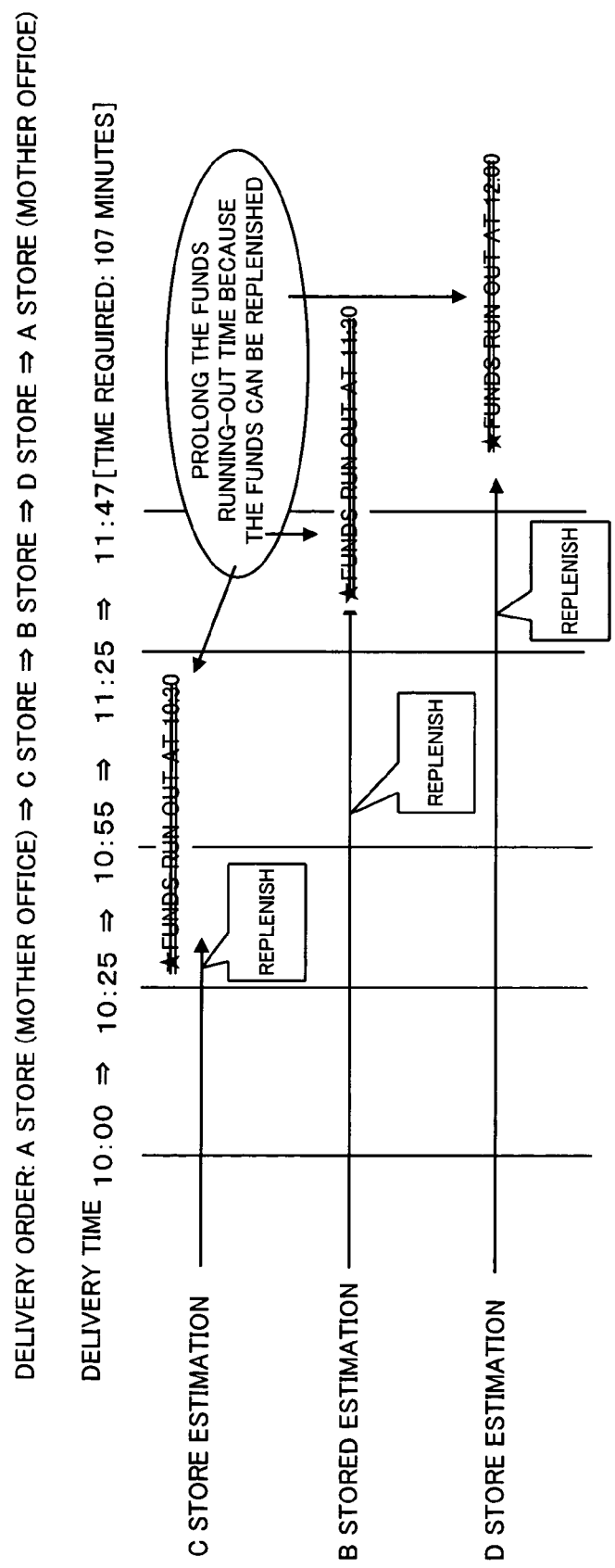
FIG. 10 is a diagram showing an example of fund delivery along the most suitable route calculated by a delivery route management system suitable for use as the delivery route calculating unit of the dispatch operation plan devising system according to the embodiment of this invention.

FIG. 10 is a diagram showing an example of funds delivery along the most suitable route determined by the delivery route managing system suitable for use as the delivery route calculating unit of the dispatch operation plan devising system according to the embodiment of this invention. In this example, in order to prevent the funds from running out in the automatic machines (the ATMs 10, 10*a*, and the like) in the service office 102 and the unattended store 103, the dates/times when the funds will run out calculated by the funds running-out date/time calculating unit 205 are arranged in the descending order from the current time to determine the delivery route, thereby preventing running-out of the funds.

If the number of the stores is large, there is possibility that time required for delivery increases when the delivery route is determined on the basis of only funds running-out dates/times. For this, the delivery route is so determined that the funds do not run out and the delivery is done from the nearer store, in consideration of the moving time from one store to another in the map information managed by the map information managing unit 218, as well.

(1) Funds Delivery Route Calculation Conditions

Conditions under which the funds delivery route is calculated in this example are as follows.

① Stores are four: A (main office), B, C and D.
② The funds are delivered by one funds delivery vehicle from A store (mother office).
③ The current date/time is 10:00 a.m. Dec. 3 (Monday), 2001.
④ Estimated dates/times when the funds will run out are as follows:
  The funds will run out at B store 90 minutes after [at 12:00 p.m. Dec. 3 (Monday), 2001];
  The funds will run out at C store 30 minutes after [at 10:30 a.m. Dec. 3 (Monday), 2001];
  The funds will run out at D store 120 minutes after [at 12:30 p.m. Dec. 3 (Monday), 2001].
⑤ Positional relationships among the stores are as shown in FIGS. 8(A) and 8(B)

(2) Description of the Time to Deliver Funds

In this case, stores (including attended/unattended stores) of the bank are A (mother office), B, C and D, and the delivery route for funds replenishment is from A (main office) to B to C to D to A (mother office).

The funds delivery route managing apparatus 202 in the security company 104 manages elements such as the moving time from one store to another, etc. in this example, as shown in FIG. 8(B).

The funds estimation managing apparatus 201 in the mother office estimates that the funds will run out at B store 90 minutes after, the funds will run out at C store 30 minutes after and the funds will run out at D store 120 minutes after. The present time is assumed to be 10:00 a.m.

When the funds (cash) are delivered under the above conditions, the order to deliver the fund is from A store (mother office) to C store to B store to D store to A store (main office), as shown in FIG. 10.

In the above order of delivery, it is estimated that the funds are replenished at 10:25 a.m. at C store, so that 10:30 a.m., the funds running-out time, can be prolonged. At B store, the funds are estimated to be replenished at 10:55 a.m., so that 11:30 a.m., the funds running-out time, can be prolonged. At D store, the funds are assumed to be replenished at 11:25 a.m., so that 12:00 a.m., the funds running-out time, can be prolonged. As this, the funds are efficiently delivered to the stores.

§ 5:Description of Examples of Practical Apparatus and Record Medium

Figure 11:
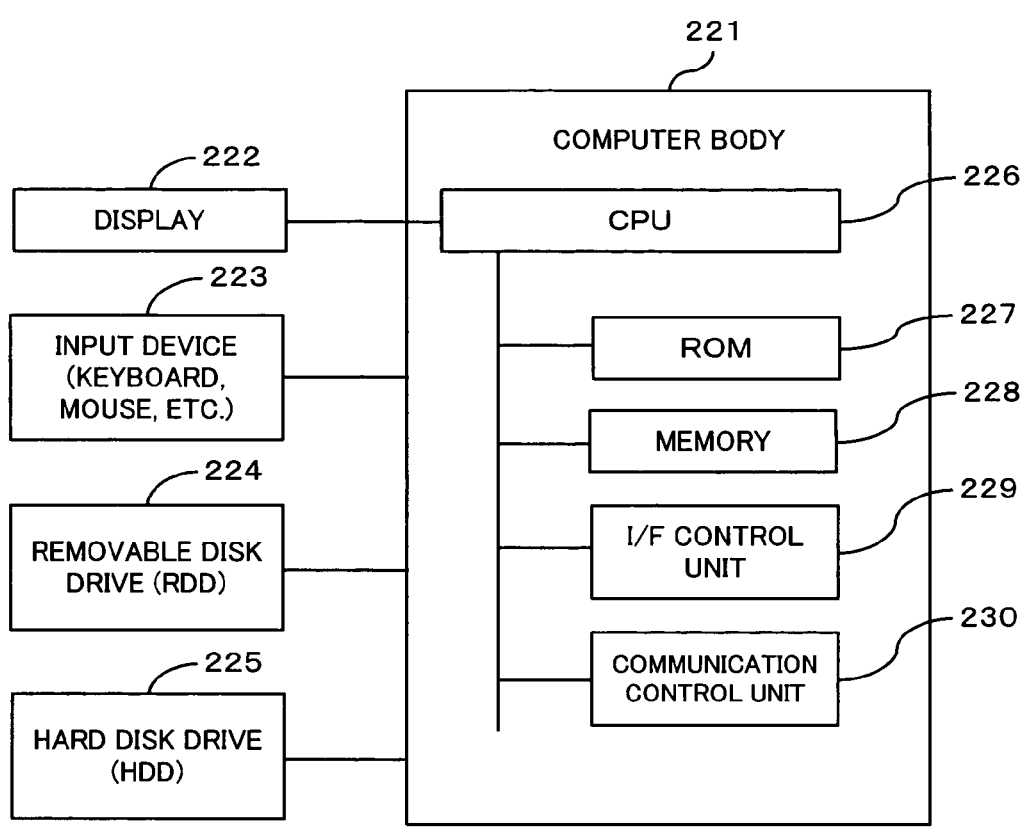
FIG. 11 is a diagram showing a practical example of a delivery route managing apparatus suitable for use as the delivery route calculating unit of the dispatch operation plan devising system according to the embodiment of this invention.

FIG. 11 shows a practical example of the delivery route managing apparatus. The funds estimation managing apparatus 201 in the mother office or the funds delivery route managing apparatus 202 in the security company may be realized with an arbitrary computer such as a work station, a personal computer or the like. This apparatus comprises a computer body 221, along with a display apparatus 222, an input apparatus (keyboard, mouse and/or the like) 223, a removable disk drive (referred as "RDD") 224, a hard disk apparatus (referred as "HDD") connected to the computer body 221, etc. Incidentally, the hard disk apparatus 25 corresponds to the hard disk apparatus 219 or the like shown in FIG. 7.

The computer body 221 has a CPU 226 carrying out various internal controls and processing, a ROM 227 (non-volatile memory) for storing programs and various data therein, a memory 228, an interface control unit (refer to "I/F control unit") 229, a communication control unit 230, etc. Incidentally, the RDD 224 includes a flexible disk drive, an optical disk drive and the like.

In the apparatus configured as above, a program for realizing the processes by the funds estimation managing apparatus 201 of the mother office and the funds delivery route managing apparatus 202 of the security company is stored in a magnetic disk (record medium) of the HDD 25, for example, and read out and executed by the CPU 226. The CPU 226 thereby executes the processes carried out by the funds estimation managing apparatus 201 of the mother office and the funds delivery route managing apparatus 202 of the security company 202.

However, the present invention is not limited to the above example. It is alternatively possible to store the program in the magnetic disk of the HDD 24 in the following manner and execute the program by the CPU 226 to carry out the above processes.

① A program (program data made by another apparatus) made by another apparatus and stored in a removable disk is read by the RDD 224, and stored in a record medium of the HDD 25.

② Data such as a program transmitted from another apparatus over a communication line is received through the communication control unit 230, and stored in a record medium (magnetic disk) of the HDD 25.

Note that the present invention is not limited to the above examples, but may be modified in various ways without departing from the scope of the invention.

So long as the embodiments of the present invention are disclosed, a person skilled in the art can manufacture the system.

What is claimed is:

1. A dispatch operation plan devising system devising a plan for at least one dispatch operation that an operator is dispatched to a cash automatic transaction apparatus and works thereat, comprising:
   a demand estimating unit estimating a demand for a replenishment to said cash automatic transaction apparatus; and
   an enforcement plan making unit making an enforcement plan for said dispatch operation on the basis of a result of demand estimation made by said demand estimating unit so that a cost of dispatch of said operator is minimized.

2. A dispatch operation plan devising system devising a plan for at least one dispatch operation that an operator is dispatched to a cash automatic transaction apparatus and works thereat, comprising:
   an abnormal information obtaining unit obtaining abnormal information on said cash automatic transaction apparatus;
   a calculating unit calculating a cost of dispatch of said operator; and
   an enforcement plan making unit making an enforcement plan for said dispatch operation on the basis of said abnormal information so that the cost of dispatch of said operator calculated by said calculating unit is minimized.

3. A dispatch operation plan devising system devising a plan for at least one dispatch operation that an operator is dispatched to a cash automatic transaction apparatus and works thereat, comprising:
   a demand estimating unit estimating a demand for a replenishment to said cash automatic transaction apparatus;
   an abnormal information obtaining unit obtaining abnormal information on said cash automatic transaction apparatus; and
   an enforcement plan making unit making an enforcement plan for said dispatch operation on the basis of a result of demand estimation made by said demand estimating unit and said abnormal information so that a cost of dispatch of said operator is minimized.

4. The dispatch operation plan devising system according to claim 1, wherein said replenishment is cash, and said enforcement plan making unit makes an enforcement plan for said dispatch operation on the basis of a surplus interest loss of said cash in said cash automatic transaction apparatus and the number of times of dispatch of said operator.

5. The dispatch operation plan devising system according to claim 3, wherein said replenishment is cash, and said enforcement plan making unit makes an enforcement plan for said dispatch operation on the basis of a surplus interest loss of said cash in said cash automatic transaction apparatus and the number of times of dispatch of said operator.

6. The dispatch operation plan devising system according to claim 1, wherein said replenishment is consumables, and said enforcement plan making unit makes an enforcement plan for said dispatch operation on the basis of the number of times of dispatch of said operator.

7. The dispatch operation plan devising system according to claim 3, wherein said replenishment is consumables, and said enforcement plan making unit makes an enforcement plan for said dispatch operation on the basis of the number of times of dispatch of said operator.

8. The dispatch operation plan devising system according to claim 1 further comprising:
   an operator selecting unit selecting at least one operator who does said dispatch operation among two or more operator candidates who can be said operator to do said dispatch operation on the basis of dispatch history information on said operator candidates.

9. The dispatch operation plan devising system according to claim 2 further comprising:
   an operator selecting unit selecting at least one operator who does said dispatch operation among two or more operator candidates who can be said operator to do said dispatch operation on the basis of dispatch history information on said operator candidates.

10. The dispatch operation plan devising system according to claim 3 further comprising:
    an operator selecting unit selecting at least one operator who does said dispatch operation among two or more operator candidates who can be said operator to do said dispatch operation on the basis of dispatch history information on said operator candidates.

11. The dispatch operation plan devising system according to claim 1 further comprising:
    a compensating unit being able to compensate said enforcement plan made by said enforcement plan making unit.

12. The dispatch operation plan devising system according to claim 2 further comprising:
a compensating unit being able to compensate said enforcement plan made by said enforcement plan making unit.

13. The dispatch operation plan devising system according to claim 3 further comprising:
a compensating unit being able to compensate said enforcement plan made by said enforcement plan making unit.

14. A dispatch operation plan devising apparatus devising a plan for at least one dispatch operation that an operator is dispatched to a cash automatic transaction apparatus and works thereat, comprising:
a demand estimating unit estimating a demand for a replenishment to said cash automatic transaction apparatus; and
an enforcement plan making unit making an enforcement plan for said dispatch operation on the basis of a result of demand estimation made by said demand estimating unit so that a cost of dispatch of said operator is minimized.

15. A dispatch operation plan devising apparatus devising a plan for at least one dispatch operation that an operator is dispatched to a cash automatic transaction apparatus and works thereat, comprising:
an abnormal information obtaining unit obtaining abnormal information on said cash automatic transaction apparatus;
a calculating unit calculating a cost of dispatch of said operator; and
an enforcement plan making unit making an enforcement plan for said dispatch operation on the basis of said abnormal information so that the cost of dispatch of said operator calculated by said calculating unit is minimized.

16. A dispatch operation plan devising apparatus devising a plan for at least one dispatch operation that an operator is dispatched to a cash automatic transaction apparatus and works thereat, comprising:
a demand estimating unit estimating a demand for a replenishment to said cash automatic transaction apparatus;
an abnormal information obtaining unit obtaining abnormal information on said cash automatic transaction apparatus; and
an enforcement plan making unit making an enforcement plan for said dispatch operation on the basis of a result of demand estimation made by said demand estimating unit and said abnormal information so that a cost of dispatch of said operator is minimized.

17. A computer readable record medium holding a dispatch operation plan devising program for devising a plan for at least one dispatch operation that an operator is dispatched to a cash automatic transaction apparatus and works thereat, said dispatch operation plan devising program making a computer function as:
a demand estimating unit estimating a demand for a replenishment to said cash automatic transaction apparatus; and
an enforcement plan making unit making an enforcement plan for said dispatch operation on the basis of a result of demand estimation made by said demand estimating unit so that a cost of dispatch of said operator is minimized.

18. A computer readable record medium holding a dispatch operation plan devising program for devising a plan for at least one dispatch operation that an operator is dispatched to a cash automatic transaction apparatus and works thereat, said dispatch operation plan devising program making a computer function as:
an abnormal information obtaining unit obtaining abnormal information on said cash automatic transaction apparatus;
a calculating unit calculating a cost of dispatch of said operator; and
an enforcement plan making unit making an enforcement plan for said dispatch operation on the basis of said abnormal information so that the cost of dispatch of said operator calculated by said calculating unit is minimized.

19. A computer readable record medium holding a dispatch operation plan devising program for devising a plan for at least one dispatch operation that an operator is dispatched to a cash automatic transaction apparatus and works thereat, said dispatch operation plan devising program making a computer function as:
a demand estimating unit estimating a demand for a replenishment to said cash automatic transaction apparatus;
an abnormal information obtaining unit obtaining abnormal information on said cash automatic transaction apparatus; and
an enforcement plan making unit making an enforcement plan for said dispatch operation on the basis of a result of demand estimation made by said demand estimating unit and said abnormal information so that a cost of dispatch of said operator is minimized.

20. A dispatch operation plan devising system devising a plan for at lest one dispatch operation that an operator is dispatched to a cash automatic transaction apparatus and works thereat, comprising:
an abnormal information obtaining unit obtaining abnormal information on said cash automatic transaction apparatus;
an enforcement plan making unit making an enforcement plan for said dispatch operation on the basis of said abnormal information so that a cost of dispatch of said operator is minimized; and
an operator selecting unit selecting at least one operator who does said dispatch operation among two or more operator candidates who can be said operator to do said dispatch operation on the basis of dispatch history information on said operator candidates.

* * * * *

UNITED STATES PATENT AND TRADEMARK OFFICE
CERTIFICATE OF CORRECTION

PATENT NO. : 7,028,887 B2
APPLICATION NO. : 10/739942
DATED : April 18, 2006
INVENTOR(S) : Kenichi Chigira et al.

It is certified that error appears in the above-identified patent and that said Letters Patent is hereby corrected as shown below:

Col. 32, line 40, change "lest" to --least--.

Signed and Sealed this

Fifteenth Day of August, 2006

JON W. DUDAS
*Director of the United States Patent and Trademark Office*